US012795699B2

(12) United States Patent
Li et al.

(10) Patent No.: US 12,795,699 B2
(45) Date of Patent: Nov. 10, 2026

(54) ULTICAST SERVICE TRANSMISSION METHOD AND APPARATUS

(71) Applicant: HUAWEI TECHNOLOGIES CO., LTD., Shenzhen (CN)

(72) Inventors: Meng Li, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 366 days.

(21) Appl. No.: 18/360,852

(22) Filed: Jul. 28, 2023

(65) Prior Publication Data

US 2023/0371049 A1 Nov. 16, 2023

Related U.S. Application Data

(63) Continuation of application No. PCT/CN2021/141413, filed on Dec. 25, 2021.

(30) Foreign Application Priority Data

Feb. 10, 2021 (CN) ........................ 202110184085.3

(51) Int. Cl.
*H04W 72/30* (2023.01)
*H04W 72/543* (2023.01)
*H04W 76/12* (2018.01)

(52) U.S. Cl.
CPC ......... *H04W 72/30* (2023.01); *H04W 72/543* (2023.01); *H04W 76/12* (2018.02)

(58) Field of Classification Search
CPC ... H04L 1/1861; H04L 1/1864; H04L 5/0053; H04L 5/0091; H04L 1/00; H04L 5/00;
(Continued)

(56) References Cited

U.S. PATENT DOCUMENTS

2004/0264490 A1 12/2004 Sarkkinen et al.
2013/0294326 A1* 11/2013 Jiao ....................... H04W 76/11 370/312

(Continued)

FOREIGN PATENT DOCUMENTS

CN 101163320 A 4/2008
CN 110098942 A 8/2019

(Continued)

OTHER PUBLICATIONS

3rd Generation Partnership Project; Technical Specification Group Services and System Aspects; Study on architectural enhancements for 5G multicast-broadcast services (Release 17), 3GPP TR 23.757 V0.4.0 (Jun. 2020), Technical Report, total 157 pages.

(Continued)

*Primary Examiner* — Nathan S Taylor

(57) ABSTRACT

This disclosure provides a multicast service transmission method and apparatus, to avoid a resource waste and help save resources. The method is applied to a scenario in which a terminal device moves from a source access network device to a target access network device. The method includes: obtaining multicast capability information of the target access network device; and sending information about a multicast session to the target access network device when the multicast capability information indicates that the target access network device supports multicast, where the information about the multicast session is used for allocating a transmission resource to the multicast session, and the multicast session is used for transmitting data of a multicast service corresponding to the terminal device.

10 Claims, 9 Drawing Sheets

(58) Field of Classification Search

CPC .... H04L 12/18; H04W 52/08; H04W 52/146; H04W 52/325; H04W 52/362; H04W 52/367; H04W 52/54; H04W 72/044; H04W 72/23; H04W 52/32; H04W 72/04; H04W 76/16; H04W 76/34; H04W 8/14; H04W 8/20; H04W 24/02; H04W 24/04; H04W 76/15; H04W 76/25; H04W 8/205; H04W 88/06; H04W 16/32; H04W 72/0457; H04W 76/20; H04W 36/0007; H04W 36/12; H04W 4/06; H04W 72/21; H04W 72/30; H04W 72/543; H04W 76/12; H04W 76/40; H04W 36/00; H04W 36/08; H04W 72/00

See application file for complete search history.

(56) References Cited

U.S. PATENT DOCUMENTS

2015/0334537 A1* 11/2015 Kathuria ................. H04W 4/06 370/312
2020/0245398 A1 7/2020 Yang
2020/0267513 A1* 8/2020 Zhu .................... H04N 21/6131
2020/0344576 A1* 10/2020 Li ........................... H04W 4/06
2022/0377507 A1* 11/2022 Xie ....................... H04W 48/18
2023/0082017 A1* 3/2023 Hong .................... H04W 76/22 370/312
2023/0141637 A1* 5/2023 Wang ...................... H04W 4/08 370/329
2023/0188949 A1* 6/2023 Jia ......................... H04L 12/189 455/458
2023/0199569 A1* 6/2023 Cao ................... H04W 36/0061 370/331
2023/0254668 A1* 8/2023 Fujishiro ................. H04W 4/06
2023/0292227 A1* 9/2023 Wang ................ H04W 36/0007
2023/0319649 A1* 10/2023 Zhu ................... H04W 36/0007 370/312
2023/0337326 A1* 10/2023 Estevez ................. H04W 76/40
2023/0345310 A1* 10/2023 Li .......................... H04W 72/30
2023/0354106 A1* 11/2023 Godin ................... H04W 72/30

FOREIGN PATENT DOCUMENTS

CN 111866975 A 10/2020
WO WO-2022152625 A1 * 7/2022 .............. H04W 4/06

OTHER PUBLICATIONS

3GPP TSG SA2 Meeting #139E, S2-2003966, KI#7, New Solution: Inter-RAN node MBS Session Handover, Huawei, Hisilicon, Elbonia, Jun. 1 -12, 2020, total 8 pages.
3GPP TR 23.757 V0.3.0 (Jan. 2020), 3rd Generation Partnership Project; Technical Specification Group Services and System Aspects; Study on architectural enhancements for 5G multicast-broadcast services(Release 17), 37 pages.
3GPP TS 23.501 V16.7.0:"3rd Generation Partnership Project; Technical Specification Group Services and System Aspects; System architecture for the 5G System (5GS); Stage 2 (Release 16)",Dec. 2020,total 450 pages.
3GPP TS 23.502 V16.7.1:"3rd Generation Partnership Project; Technical Specification Group Services and System Aspects; Procedures for the 5G System (5GS); Stage 2(Release 16)",Jan. 2021, total 139 pages.
3GPP TSG SA2 Meeting #139E, S2-2004510,KI#7, New Solution: Inter-RAN node MBS Session Handover, Huawei, Hisilicon, OPPO, Elbonia, Jun. 1-12, 2020,total 9 pages.
3GPP TSG-WG SA2 Meeting #141E e-meeting, S2-2008109,KI#7: Evaluation and Conclusion of KI#7, Huawei, HiSilicon, ZTE, OPPO, Samsung, Elbonia, Oct. 12-23, 2020, total 2 pages.
SA WG2 Meeting #140E, S2-2004980, "KI#7, Sol#27: Update to remove ENs and further clarify", OPPO , XP051919878, Aug. 19-Sep. 1, 2020, Elbonia, total 9 pages.

* cited by examiner

ULTICAST SERVICE TRANSMISSION METHOD AND APPARATUS

CROSS-REFERENCE TO RELATED APPLICATIONS

This application is a continuation of International Application No. PCT/CN2021/141413, filed on Dec. 25, 2021, which claims priority to Chinese Patent Application No. 202110184085.3, filed on Feb. 10, 2021. The disclosures of the aforementioned applications are hereby incorporated by reference in their entireties.

TECHNICAL FIELD

This application relates to the communication field, and more specifically, to a multicast service transmission method and apparatus.

BACKGROUND

A multimedia broadcast multicast service (MBMS) is a service oriented to a plurality of user equipments (UEs), for example, live broadcast and scheduled program playback. A multicast transmission technology is a technology in which the MBMS is simultaneously sent to the plurality of UEs through a base station. Between a network and UE, the MBMS may be sent to the UE in a unicast manner by establishing a UE-specific bearer, or may be sent to the UE in a broadcast manner by establishing an MBMS-specific bearer.

Currently, a specific propagation mode used to transmit the MBMS is related to whether the base station supports the multicast transmission technology. If the base station supports multicast, multicast transmission is performed. If the base station does not support multicast, unicast transmission is performed. In a scenario in which the UE moves or is handed over between different base stations, if a base station in which the UE is located supports multicast after the handover but unicast transmission is still performed, a multicast resource cannot be established, thereby causing a resource waste. Therefore, how to prevent the resource waste is an urgent problem to be resolved.

SUMMARY

In view of this, this application provides a multicast service transmission method and apparatus, to help avoid a resource waste.

According to a first aspect, a multicast service transmission method is provided. The method is applied to a scenario in which a terminal device moves from a source access network device to a target access network device. For example, the method may be performed by a session management network element, or may be performed by a component (such as a circuit, a chip, or a chip system) configured in the session management network element. This is not limited in this application.

The method includes: obtaining multicast capability information of the target access network device; and sending information about a multicast session to the target access network device when the multicast capability information indicates that the target access network device supports multicast, where the information about the multicast session is used for allocating a transmission resource to the multicast session, and the multicast session is used for transmitting data of a multicast service corresponding to the terminal device.

Optionally, before the session management network element obtains the multicast capability information of the target access network device, the method further includes: The session management network element determines that the source access network device does not support multicast.

In the scenario in which the terminal device moves from the source access network device to the target access network device, when the source access network device does not support multicast, if the session management network element cannot learn multicast capability information of the target access network device, unicast transmission is still performed when the session management network element supports multicast, which causes a resource waste (for example, air interface resources and transmission network side resources). In this embodiment of this application, the session management network element obtains the multicast capability information of the target access network device, and sends the information about the multicast session to the target access network device when the multicast capability information indicates that the target access network device supports multicast. Therefore, the target access network device establishes a resource for multicast transmission, which can prevent the resource waste and help save resources.

The session management network element may obtain the multicast capability information of the target access network device through different implementations, which are respectively described in detail below.

In a possible implementation, the session management network element may locally query the multicast capability information of the target access network device. In this way, the session management network element does not need to initiate a query request to a mobility management network element, which helps reduce overheads.

Optionally, the session management network element obtains the multicast capability information based on an identifier of the target access network device and a first correspondence, where the first correspondence includes a correspondence between the identifier of the target access network device and the multicast capability information.

Optionally, the method further includes: The session management network element receives the identifier of the target access network device from a mobility management network element. The session management network element may perform local query by using the identifier of the target access network device after obtaining the identifier of the target access network device, to obtain multicast capability information corresponding to the identifier of the target access network device.

In a possible implementation, the session management network element receives the multicast capability information of the target access network device from the mobility management network element. In other words, the session management network element may receive the multicast capability information of the target access network device from the mobility management network element, and does not need to query locally whether the multicast capability information of the target access network device is stored, thereby preventing query overheads.

Further, the session management network element may initiate a query to the mobility management network element, so as to obtain the multicast capability information of the target access network device. For an implementation in which the session management network element receives the multicast capability information of the target access network device from the mobility management network element, the method further includes: The session management network element sends a query request to the mobility management network element, where the query request is used for requesting the multicast capability information of the target access network device.

Optionally, the query request includes an identifier of the terminal device or an identifier of the target access network device.

In a possible implementation, if the session management network element finds, after local query, that the multicast capability information of the target access network device is not locally stored, the session management network element may initiate a query request to the mobility management network element to obtain the multicast capability information of the target access network device.

Optionally, before the session management network element sends the query request to the mobility management network element, the method further includes: The session management network element determines that the multicast capability information of the target access network device is not locally included.

Optionally, the multicast capability information of the target access network device is carried in an N11 interface message.

According to a second aspect, a multicast service transmission method is provided. For example, the method may be performed by a session management network element, or may be performed by a component (such as a circuit, a chip, or a chip system) configured in the session management network element. This is not limited in this application.

The method includes: sending information about a multicast session to an access network device, where the information about the multicast session is used for allocating a transmission resource to the multicast session, and the multicast session is used for transmitting data of a multicast service; receiving first information, where the first information indicates that a target access network device supports multicast; and triggering, based on the first information, a unicast user plane network element to configure a unicast protocol data unit PDU session, where the unicast PDU session is not used for transmitting the data of the multicast service; or triggering, by the session management network element, a multicast session management network element to send configuration information to a multicast user plane network element, where the configuration information is used for configuring the multicast user plane network element to stop transmitting the data of the multicast service to the unicast user plane network element.

In this embodiment of this application, the session management network element sends the information about the multicast session to the access network device, to test whether the access network device supports multicast. If the access network device supports multicast, the session management network element establishes a resource for multicast transmission, which can prevent the resource waste and help save resources.

Optionally, the method further includes: The session management network element triggers, based on the first information, establishment of a multicast path between a user plane network element corresponding to the multicast session and the access network device.

In a possible implementation, the method is applied to a scenario in which a terminal device moves from a source access network device to the target access network device. In this case, the foregoing access network device is a target access network device.

Optionally, before the session management network element sends the information about the multicast session to the access network device, the method further includes: The session management network element determines that at least one of the following conditions is met: the source access network device does not support multicast, the session management network element does not include multicast capability information of the target access network device locally, or the session management network element does not include multicast capability information of the source access network device locally. Therefore, the session management network element triggers, only when determining that the at least one of the foregoing conditions is met, a test to determine whether the target access network device supports multicast.

According to a third aspect, a multicast service transmission method is provided. For example, the method may be performed by an access network device, or may be performed by a component (such as a circuit, a chip, or a chip system) configured in the access network device. This is not limited in this application.

The method includes: receiving information about a multicast session, where the multicast session is used for transmitting data of a multicast service; sending first information to a session management network element, where the first information indicates that the access network device supports multicast; establishing a multicast path with a user plane network element corresponding to the multicast session; and transmitting the data of the multicast service through the multicast path.

In this embodiment of this application, the access network device receives the information about the multicast session sent by the session management network element. If multicast is supported, the access network device sends the first information to the session management network element, to notify the session management network element that the multicast is supported. If the access network device supports multicast, the access network device establishes a resource for multicast transmission with the user plane network element corresponding to the multicast session, which can avoid a resource waste and help save resources.

According to a fourth aspect, a multicast service transmission method is provided. The method is applied to a scenario in which a terminal device moves from a source access network device to a target access network device. For example, the method may be performed by a mobility management network element, or may be performed by a component (such as a circuit, a chip, or a chip system) configured in the mobility management network element. This is not limited in this application.

The method includes: obtaining multicast capability information of the target access network device; and sending the multicast capability information of the target access network device to a session management network element.

In this embodiment of this application, the mobility management network element obtains the multicast capability information of the target access network device, and sends the multicast capability information to the session management network element. In this way, the session management network element sends the information about the multicast session to the target access network device when the multicast capability information indicates that the target access network device supports multicast. In this way, the target access network device establishes a resource for multicast transmission, which can avoid a resource waste and help save resources.

In a possible implementation, when the terminal device currently performs a multicast service, the mobility management network element sends the multicast capability information of the target access network device to the session management network element. Alternatively, the mobility management network element sends the multicast capability information of the target access network device to the session management network element when determining that the terminal device is currently performing a multicast service.

A manner in which the mobility management network element learns that the terminal device is currently performing a multicast service is not specifically limited in this application.

In a possible implementation, after obtaining the identification information of the multicast session, the mobility management network element may send the multicast capability information of the target access network device to the session management network element.

Optionally, the method further includes: The mobility management network element obtains identification information of a multicast session, where the multicast session is used for transmitting data of the multicast service of the terminal device. The mobility management network element sends the multicast capability information of the target access network device to the session management network element based on the identification information of the multicast session.

Further, the mobility management network element obtains the identification information of the multicast session through multicast context information of the terminal device.

It may be understood that, in addition to the identification information of the multicast session, the mobility management network element may further obtain another related information of the multicast session, and then send the multicast capability information of the target access network device to the session management network element based on the another related information of the multicast session.

In this embodiment of this application, the mobility management network element may actively send the multicast capability information of the target access network device to the session management network element, or may send the multicast capability information of the target access network device to the session management network element based on a query request sent by the session management network element. This is not limited.

In a possible implementation, the mobility management network element sends the multicast capability information of the target access network device to the session management network element based on the query request of the session management network element.

Optionally, the method further includes: The mobility management network element receives a query request from the session management network element, where the query request is used for requesting the multicast capability information of the target access network device.

It may be understood that the query request itself has a function of querying the multicast capability information of the target access network device, or the query request carries a related identifier of the target access network device, which is used for querying the multicast capability information of the target access network device. This is not limited.

For example, the query request may include an identifier of the terminal device. Because the mobility management network element can learn the access network device currently accessed by the terminal device, after receiving the query request that includes the identifier of the terminal device, the mobility management network element may feed back multicast capability information of the access network device currently accessed by the terminal device to the session management network element.

For another example, the query request may include an identifier of the target access network device. After receiving the query request that includes the identifier of the terminal device, the mobility management network element may feed back the multicast capability information of the target access network device to the session management network element.

Optionally, the mobility management network element sends an N11 interface message to the session management network element, where the N11 interface message includes the multicast capability information of the target access network device.

According to a fifth aspect, a multicast service transmission method is provided. For example, the method may be performed by an access network device, or may be performed by a component (such as a circuit, a chip, or a chip system) configured in the access network device. This is not limited in this application.

The method includes: receiving a first message from a terminal device, where the first message includes indication information and/or identification information of a multicast session, and the indication information indicates that the terminal device is performing a multicast service or the terminal device has a demand for a multicast service; sending multicast capability information of the access network device to a mobility management network element based on the first message; and receiving information of the multicast session from the mobility management network element, where the information about the multicast session is used for allocating a transmission resource to the multicast session, and the multicast session is used for transmitting data of a multicast service corresponding to the terminal device.

In this embodiment of this application, the access network device may notify, through the first message sent by the terminal device, the terminal device that multicast data is currently to be transmitted. If the access network device supports multicast, the access network device may notify the session management network element of multicast capability information of the access network device. In this way, when subsequently learning that the access network device supports multicast, the session management network element may establish a transmission path for multicast data, which helps establish a multicast transmission resource in a timely manner, and prevents a resource waste caused by a failure to establish a multicast transmission resource in a timely manner when an excessively large number of users receive multicast data.

Optionally, the first message is a radio resource control RRC reconfiguration message.

Optionally, the method is applied to a scenario in which a terminal device moves from a source access network device to a target access network device. In this case, the access network device is a target access network device. The first message is a handover confirm message. Alternatively, the handover confirm message is carried in the RRC reconfiguration message.

Optionally, the multicast capability information of the access network device is carried in a path switch request message.

According to a sixth aspect, a multicast service transmission method is provided. For example, the method may be performed by a terminal device, or may be performed by a component (such as a circuit, a chip, or a chip system) configured in the terminal device. This is not limited in this application.

The method includes: generating a first message, where the first message includes indication information and/or identification information of a multicast session, and the indication information indicates that the terminal device is performing a multicast service or the terminal device has a demand for a multicast service; and sending the first message to an access network device.

In this embodiment of this application, the terminal device notifies the access network device that the terminal device currently has to-be-transmitted multicast data. If the access network device supports multicast, the access network device may notify the session management network element of multicast capability information of the access network device. In this way, when subsequently learning that the access network device supports multicast, the session management network element may establish a transmission path for multicast data, which helps establish a multicast transmission resource in a timely manner, and prevents a resource waste caused by a failure to establish a multicast transmission resource in a timely manner when an excessively large number of users receive multicast data.

Optionally, the first message is a radio resource control RRC reconfiguration message.

Optionally, the method is applied to a scenario in which a terminal device moves from a source access network device to a target access network device. In this case, the access network device is a target access network device. The first message is a handover confirm message. Alternatively, the handover confirm message is carried in the RRC reconfiguration message.

It should be understood that the methods provided in the fifth aspect and the sixth aspect are not limited to being used when the terminal device is handed over. An application scope of the method is not limited in this application.

According to a seventh aspect, a multicast service transmission apparatus is provided, including modules or units configured to perform the method in any one of the possible implementations of the first aspect to the sixth aspect.

According to an eighth aspect, a multicast service transmission apparatus is provided, including a processor. The processor is coupled to a memory, and may be configured to execute instructions or data in the memory, to implement the method in any one of the possible implementations of the first aspect and the second aspect. Optionally, the apparatus further includes a memory. Optionally, the apparatus further includes a communication interface, and the processor is coupled to the communication interface.

In an implementation, the apparatus is a session management network element. When the communication apparatus is a session management network element, the communication interface may be a transceiver or an input/output interface.

In another implementation, the apparatus is a chip configured in a session management network element. When the communication apparatus is a chip configured in a session management network element, the communication interface may be an input/output interface.

Optionally, the transceiver may be a transceiver circuit. Optionally, the input/output interface may be an input/output circuit.

According to a ninth aspect, a multicast service transmission apparatus is provided, including a processor. The processor is coupled to the memory, and may be configured to execute an instruction or data in the memory, to implement the method in any one of the possible implementations of the fourth aspect. Optionally, the apparatus further includes a memory. Optionally, the apparatus further includes a communication interface, and the processor is coupled to the communication interface.

In an implementation, the apparatus is a mobility management network element. When the communication apparatus is a mobility management network element, the communication interface may be a transceiver or an input/output interface.

In another implementation, the apparatus is a chip configured in a mobility management network element. When the communication apparatus is a chip configured in the mobility management network element, the communication interface may be an input/output interface.

Optionally, the transceiver may be a transceiver circuit. Optionally, the input/output interface may be an input/output circuit.

According to a tenth aspect, a multicast service transmission apparatus is provided, including a processor. The processor is coupled to a memory, and may be configured to execute an instruction or data in the memory, to implement the method in the third aspect or any one of the possible implementations of the fifth aspect. Optionally, the apparatus further includes a memory. Optionally, the apparatus further includes a communication interface, and the processor is coupled to the communication interface.

In an implementation, the apparatus is an access network device. When the communication apparatus is an access network device, the communication interface may be a transceiver or an input/output interface.

In another implementation, the apparatus is a chip configured in an access network device. When the communication apparatus is a chip configured in the access network device, the communication interface may be an input/output interface.

Optionally, the transceiver may be a transceiver circuit. Optionally, the input/output interface may be an input/output circuit.

According to an eleventh aspect, a multicast service transmission apparatus is provided, including a processor. The processor is coupled to the memory, and may be configured to execute an instruction or data in the memory, to implement the method in any one of the possible implementations of the sixth aspect. Optionally, the apparatus further includes a memory. Optionally, the apparatus further includes a communication interface, and the processor is coupled to the communication interface.

In an implementation, the apparatus is a terminal device. When the communication apparatus is the terminal device, the communication interface may be a transceiver or an input/output interface.

In another implementation, the apparatus is a chip disposed in a terminal device. When the communication apparatus is a chip configured in the terminal device, the communication interface may be an input/output interface.

Optionally, the transceiver may be a transceiver circuit. Optionally, the input/output interface may be an input/output circuit.

According to a twelfth aspect, a processor is provided, including: an input circuit, an output circuit, and a processing circuit. The processing circuit is configured to receive a signal through the input circuit, and transmit a signal through the output circuit, so that the processor performs the method in any one of the possible implementations of the first aspect to the sixth aspect.

In a specific implementation process, the foregoing processor may be one or more chips, the input circuit may be an input pin, the output circuit may be an output pin, and the processing circuit may be a transistor, a gate circuit, a flip-flop, various logic circuits, and the like. An input signal received by the input circuit may be received and input by, for example, but not limited to, a receiver, a signal output by the output circuit may be, for example, but not limited to, output to and transmitted by the transmitter, and the input circuit and the output circuit may be a same circuit. The circuit is used as an input circuit and an output circuit at different moments. Specific implementations of the processor and various circuits are not limited in embodiments of this application.

According to a thirteenth aspect, a processing apparatus is provided, including a processor and a memory. The processor is configured to read an instruction stored in the memory, receive a signal through a receiver, and transmit a signal through a transmitter, to perform the method in any one of the possible implementations of the first aspect to the sixth aspect.

Optionally, there are one or more processors, and there are one or more memories.

Optionally, the memory may be integrated with the processor, or the memory and the processor may be set separately.

In a specific implementation process, the memory may be a non-transitory memory, for example, a read-only memory (read only memory, ROM). The memory and the processor may be integrated on a same chip, or may be separately disposed on different chips. A type of the memory and a manner of setting the memory and the processor are not limited in this embodiment of this application.

It should be understood that a related data exchange process, for example, sending indication information, may be a process of outputting indication information from the processor, and receiving capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus in the thirteenth aspect may be one or more chips. The processor in the processing apparatus may be implemented through hardware, or may be implemented through software. When implemented through hardware, the processor may be a logic circuit, an integrated circuit, or the like. When being implemented through software, the processor may be a general-purpose processor, and is implemented by reading software code stored in a memory. The memory may be integrated into the processor, may be located outside the processor, and exists independently.

According to a fourteenth aspect, a computer program product is provided, where the computer program product includes: a computer program (which may also be referred to as code or an instruction). When the computer program is run, a computer is enabled to perform the method in any one of the possible implementations of the first aspect to the sixth aspect.

According to a fifteenth aspect, a computer-readable storage medium is provided. The computer-readable storage medium stores a computer program (which may also be referred to as code or an instruction). When the computer program is run on a computer, the computer is enabled to perform the method in any one of the possible implementations of the first aspect to the sixth aspect.

According to a sixteenth aspect, a communication system is provided, including one or more of the foregoing session management network element, mobility management network element, source access network device, target access network device, and terminal device.

DESCRIPTION OF EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a fifth generation (5th generation, 5G) system, a new radio (NR) system, or another evolved communication system.

The technical solutions provided in this application may be further applied to a future communication system, for example, a sixth generation mobile communication system. This is not limited in this application.

The technical solutions provided in this application may be further applied to machine type communication (MTC), long term evolution-machine (LTE-M), a device-to-device (D2D) network, a machine-to-machine (M2M) network, the internet of things (IoT) network, or another network. The IoT network may include, for example, the internet of vehicles. Communication manners in the internet of vehicles system are collectively referred to as vehicle-to-everything devices (vehicle-to-X, V2X, X may stand for everything). For example, the V2X may include vehicle-to-vehicle (V2V) communication, vehicle-to-infrastructure (V21) communication, vehicle-to-pedestrian (V2P) communication, vehicle-to-network (V2N) communication, or the like.

Figure 1:
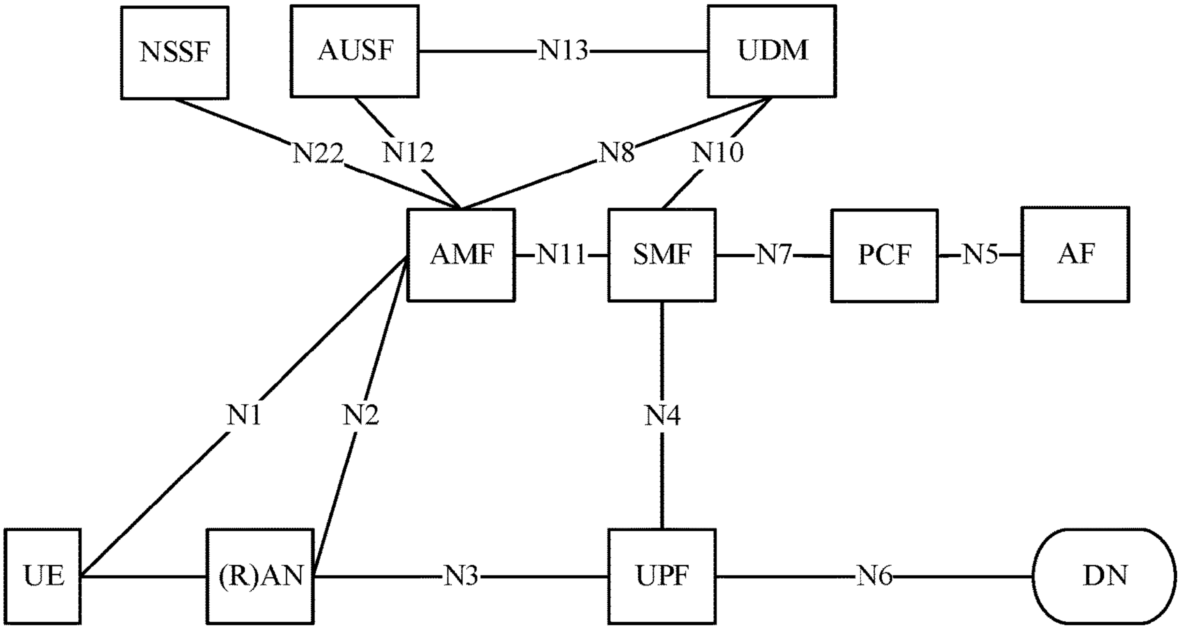
FIG. 1 is a schematic diagram of a network architecture applicable to a method according to an embodiment of this application.

FIG. 1 is a schematic diagram of a network architecture applicable to a method according to an embodiment of this application. As shown in FIG. 1, the network architecture is, for example, a 5G system (5th generation system, 5GS) defined in a 3rd generation partnership project (3GPP) protocol TS23.501. The network architecture may be divided into two parts: an access network (AN) and a core network (CN). The access network may be configured to implement functions related to radio access, and the core network mainly includes the following several key logical network elements: an access and mobility management function (AMF), a session management function (SMF), a user plane function (UPF), a policy control function (PCF), unified data management (UDM), and the like.

The following briefly describes network elements shown in FIG. 1.

1. User equipment (UE): The user equipment may be referred to as a terminal device, an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device with a wireless connection function. Currently, examples of some terminals are as follows: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with the wireless communication capability, a computing device or another processing device connected to a wireless modem, a vehicle-mounted device, a wearable device, a terminal device in a 5G network, a terminal device in a future evolved public land mobile network (PLMN), and the like. This is not limited in this embodiment of this application.

As an example instead of a limitation, in this embodiment of this application, the terminal device may further be a wearable device. The wearable device may also be referred to as a wearable intelligent device, and is a generic term for wearable devices such as glasses, gloves, watches, clothes, and shoes that are developed by using wearable technologies for intelligent design of daily wear. The wearable device is a portable device that is directly worn on a body or integrated into clothes or accessories of a user. The wearable device is not only a hardware device, but also can implement powerful functions through software support, data interaction, and cloud interaction. In a broad sense, the wearable intelligent device includes a device that has complete functions and a large size and can implement complete or partial functions without relying on a smartphone, for example, a smartwatch or smart glasses, and that focuses only on a specific type of application function and needs to be used with another device such as a smartphone, such as various smart bands and smart jewelry for physical sign monitoring.

In addition, in this embodiment of this application, the terminal device may further be a terminal device in an internet of things (IoT) system. The IoT is an important part of future information technology development, and a main technical feature of the IoT is that an object is connected to a network through a communication technology, so as to implement an intelligent network of man-machine interconnection and thing-to-thing interconnection.

2. Access network: The access network provides a network access function for user equipment, and can use transmission tunnels of different quality based on a user level, a demand for a service, and the like. The access network may be an access network using different access technologies. Currently, there are two types of radio access technologies: a 3GPP access technology (for example, a radio access technology used in a 3G, 4G, or 5G system) and a non-3GPP access technology. The 3GPP access technology is an access technology that complies with a 3GPP standard specification. For example, an access network device in a 5G system is referred to as a next generation node base station (gNB). The non-3GPP access technology is an access technology that does not comply with the 3GPP standard specification, for example, an air interface technology represented by an access point (AP) in wireless fidelity (Wi-Fi).

An access network that implements an access network function based on a wireless communication technology may be referred to as a radio access network (RAN). The radio access network can manage radio resources, provide an access service for the terminal device, and further complete forwarding of a control signal and user data between the terminal and a core network.

The radio access network may include, for example, but is not limited to: a radio network controller (RNC), a NodeB (NB), a base station controller (BSC), a base transceiver station (BTS), and a home base station (for example, a home evolved NodeB, a home NodeB, or an HNB), a baseband unit (BBU), an AP, a wireless relay node, a wireless backhaul node, a transmission point (TP), or a transmission and reception point (TRP) in a Wi-Fi system, and may further be a gNB or a transmission point (TRP or TP) in a 5G (for example, NR) system, one or one group of antenna panels (including a plurality of antenna panels) of a base station in the 5G system, or may be a network node constituting a gNB or a transmission point, for example, a baseband unit (BBU), a distributed unit (DU), or a base station in a next generation communication 6G system. A specific technology used by the radio access network device and a specific device form are not limited in embodiments of this application.

The access network may provide a service for a cell. The terminal device may communicate with the cell through the transmission resource (for example, a frequency domain resource or a spectrum resource) allocated by the access network device.

3. AMF: The AMF is mainly used for mobility management and access management, such as user location update, user network registration, and user handover. The AMF may be further configured to implement another function in a mobility management entity (MME) in addition to session management, for example, a function such as lawful interception or access authorization (or authentication).

4. SMF: The SMF is mainly used for session management, internet protocol (Internet Protocol, IP) address assignment and management of a UE, selection of a termination point of a manageable user plane function, policy control, or a charging function interface, downlink data notification, and the like. In this embodiment of this application, a primary user of the SMF is responsible for session management in a mobile network, for example, session establishment, modification, and release. The specific function may include, for example, assigning an IP address to the terminal device, and selecting a UPF that provides a packet forwarding function.

5: UPF: The UPF is a data plane gateway, which may be used for packet routing and forwarding, quality of service (QoS) processing of user plane data, or the like. User data may be accessed to a data network (DN) through a network element. In this embodiment of this application, the UPF may be configured to implement a function of a user plane gateway.

6. Data network (DN): The data network is a carrier network configured to provide a data service for a subscriber, for example, a carrier service network, an internet, a third-party service network, and an IP multi-media service network.

7. Authentication server function (AUSF): The authentication server function is mainly used for user authentication, and the like.

8. Network exposure function (NEF): The network exposure function is used for securely exposing services and capabilities provided by 3GPP network functions to external entities.

9. Network storage function (network function (NF) repository function, NRF): The network storage function is used for storing a network functional entity and description information of a service provided by the network functional entity, and supporting service discovery, network element entity discovery, and the like.

10. Policy control function (PCF): The policy control function is a unified policy framework used for guiding network behavior, and provides policy rule information for a control plane function network element (for example, an AMF or an SMF), and the like.

11. Unified data management (UDM): The unified data management is used for storing subscriber data, such as subscription information and authentication/authorization information.

12. Application function (AF): The application function is in charge of providing a service for a 3GPP network, for example, affecting service routing and interacting with the PCF for policy control.

In the network architecture shown in FIG. 1, network elements may communicate with each other through interfaces shown in the figure. As shown in the figure, an N1 interface is a reference point between the terminal device and the AMF. An N2 interface is a reference point between the RAN and the AMF, and is configured to send a non-access stratum (NAS) message, and the like. An N3 interface is a reference point between the RAN and the UPF, and is configured to transmit user plane data, and the like. An N4 interface is a reference point between the SMF and the UPF, and is configured to transmit information such as tunnel identification information of an N3 connection, data buffer indication information, and a downlink data notification message. An N5 interface is a reference point between the PCF and the AF. An N6 interface is a reference point between the UPF and the DN, and is configured to transmit user plane data, and the like. An N7 interface is a reference point between the SMF and the PCF. An N8 interface is a reference point between the AMF and the UDM. An N11 interface is a reference point between the AMF and the SMF. A relationship between another interface and each of the network elements is shown in FIG. 1. For brevity, details are not described herein.

It should be understood that the foregoing network architecture applied to embodiments of this application is merely a network architecture described from a perspective of a conventional point-to-point architecture and a service-oriented architecture by way of example, and a network architecture applicable to embodiments of this application is not limited thereto. Any network architecture that can implement functions of the foregoing network elements is applicable to embodiments of this application.

It should be further understood that the AMF, the SMF, the UPF, and the network slice selection function (NSSF) network element, the NEF, the AUSF, the NRF, the PCF, and the UDM shown in FIG. 1 may be understood as network elements configured to implement different functions in the core network, for example, may be combined as required to form a network slice. These network elements of the core network may be independent devices, or may be integrated into a same device to implement different functions. A specific form of the foregoing network elements is not limited in this application.

It should be further understood that the foregoing names are defined only for ease of distinguishing different functions, and should not constitute any limitation on this application. This application does not exclude a possibility that another name is used in the 5G network and another future network. For example, in a 6G network, some or all of the foregoing network elements may continue to use terms in 5G, or may use another name. A name of an interface between network elements in FIG. 1 is merely examples. In a specific implementation, the name of the interface may be another name. This is not specifically limited in this application. In addition, a name of a message (or signaling) transmitted between the foregoing network elements is merely an example, and does not constitute any limitation on a function of the message itself.

To facilitate understanding of embodiments of this application, terms involved in this application are first briefly described.

1. Protocol data unit (PDU) session (PDU session): A 5G core network (5GC) supports a PDU connection service. The PDU connection service may be a service of exchanging PDU data packets between a terminal device and a DN. The PDU connection service is implemented by establishing a PDU session initiated by the terminal device. The PDU session is established, that is, a data transmission path between the terminal device and the DN is established. In other words, the PDU session is a UE-level PDU session. Each terminal device may establish one or more PDU sessions.

As described above, the SMF is mainly responsible for session management in a mobile network. The PDU session may be established, modified, or released between the terminal device and the SMF through NAS session management (SM) signaling.

In this embodiment of this application, one PDU session may be identified through one PDU session identifier (PDU session ID). Because the PDU session is a UE-level PDU session, each PDU session identifier may also correspond to one terminal device.

2. QoS flow (QoS flow): A QoS flow is the most refined QoS differentiation granularity in a PDU session. In a 5G system, a QoS flow identifier (QoS flow identifier, QFI) may be configured to identify a QoS flow. One PDU session may include a plurality of QoS flows, but each QoS flow has a different QFI. In other words, a QFI is unique in one PDU session.

3. A PDU session used for transmitting multicast data may be referred to as a multicast session, a broadcast session, or a multicast and broadcast service (MB S) session. A plurality of terminal devices that receive the same multicast data may belong to one multicast group. That is, one piece of multicast data may correspond to one multicast group, or one multicast session. When the terminal device has a demand for a multicast service, the terminal device may request to join the multicast group. For example, the multicast service includes an MBS or a multimedia broadcast multicast service (MBMS).

4. Transmission of the multicast service mainly includes two modes: a shared delivery mode and an individual delivery mode. The shared transmission mode may also be referred to as a multicast transmission mode. The individual transmission mode may also be referred to as a unicast transmission mode. A unicast transmission mode or a multicast transmission mode may be used for data transmission of the multicast service. A transmission mode used for the data of the multicast service is related to whether an access network device supports multicast. If the access network device supports multicast, data of the multicast service is transmitted in the multicast transmission mode. If the access network device does not support multicast, the data of the multicast service is transmitted in the unicast transmission mode.

Figure 2:
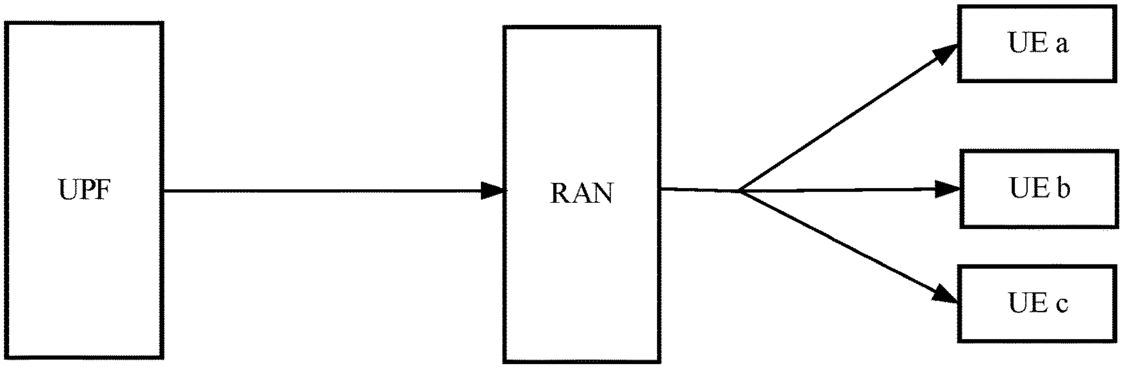
FIG. 2 is a schematic diagram of transmission of a piece of service data according to an embodiment of this application.

The multicast transmission mode means that a transmission path from a user plane function to an access network device (or referred to as a transmission tunnel, for example, a tunnel based on the general packet radio service tunneling protocol (GTP)) and a transmission path from the access network device to an air interface side of the terminal device are shared by several users in the multicast group. A schematic diagram in FIG. 2 is used as an example. The UPF sends a piece of data to the RAN, the RAN transmits the piece of data over an air interface, and UE a, UE b, and UE c in the multicast group all may receive the data.

Figure 3:
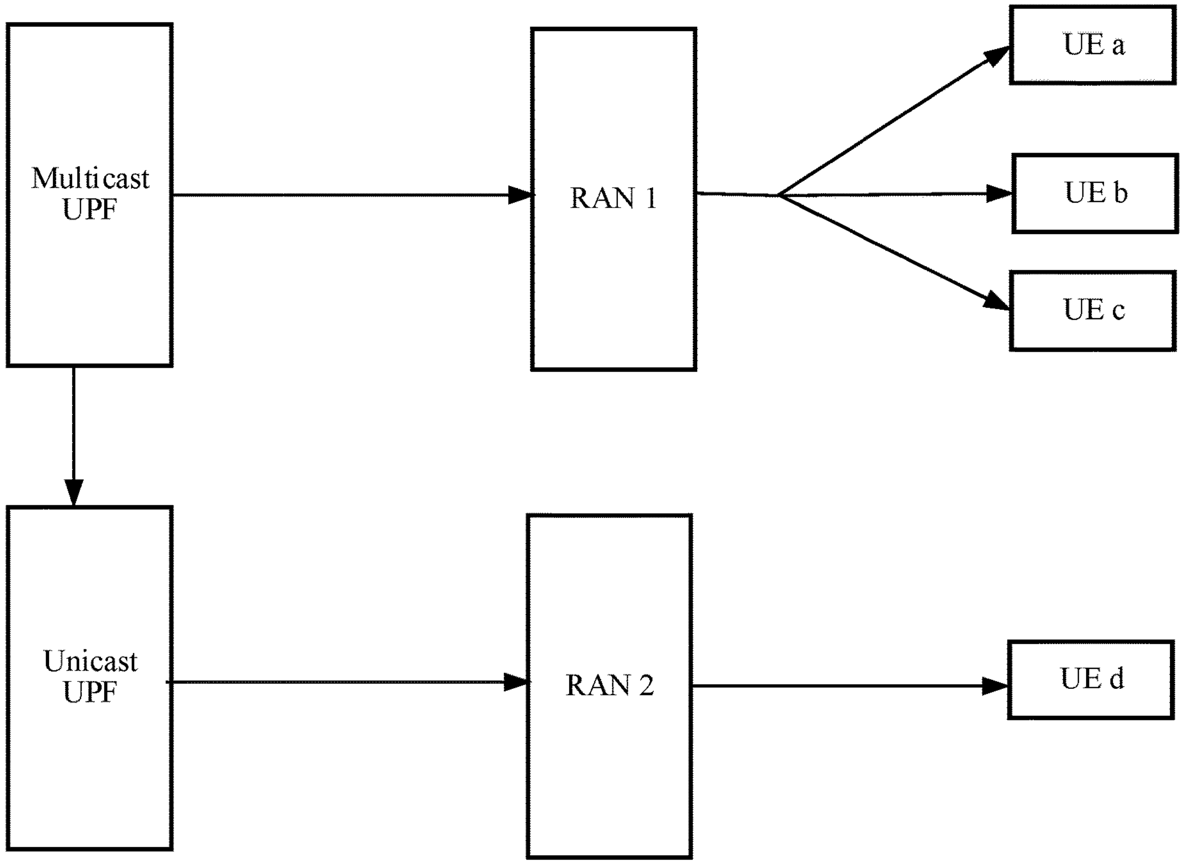
FIG. 3 is a schematic diagram of transmission of another piece of service data according to an embodiment of this application.

The unicast transmission mode means that the transmission path from the user plane function to the access network device and the transmission path from the access network device to the air interface side of the terminal device are exclusively used by a single user. A schematic diagram in FIG. 3 is used as an example. When the RAN 2 on which the UE d is camped on does not support multicast, data of the RAN 2 comes from a unicast UPF. The transmission path from the unicast UPF to the RAN 2 and the transmission path on the air interface side from the RAN 2 to the UE d are exclusively used by the UE d. A transmission path of the data is: multicast UPF->unicast UPF->RAN 2->UE d.

An access network device that supports multicast and an access network device that does not support multicast may coexist in a network. The terminal device may move from an access network device that does not support multicast to an access network device that supports multicast. The access network device that does not support multicast does not store multicast-related information. An example in which the terminal device moves or is handed over from the source access network device to the target access network device is used for description. If the source access network device does not support multicast, the source access network device does not store multicast-related information, and therefore cannot forward the multicast-related information to the target access network device. Regardless of whether the target access network device supports multicast, the target access network device cannot provide multicast-related information to the session management network element. In this way, the session management network element cannot determine whether the target access network device supports multicast.

This application provides a multicast service transmission method, so that a session management network element can learn whether an access network device (for example, a target access network device) supports multicast, and a multicast resource is established when the access network device supports multicast, thereby helping avoid a resource waste.

The multicast service transmission method provided in embodiments of this application is described in detail below with reference to a plurality of accompanying drawings.

It may be understood that, for ease of understanding and description, interaction between devices is used as an example below to describe in detail the method provided in embodiments of this application. However, this should not constitute any limitation on an execution entity of the method provided in this application. For example, the access network device shown in the following embodiments may be replaced with a component (such as a circuit, a chip, or a chip system) configured in the access network device.

A specific structure of an execution body of the method provided in embodiments of this application is not particularly limited in the embodiments shown below, provided that the method provided in embodiments of this application can be implemented by running a program that records code of the method provided in embodiments of this application.

In addition, for ease of understanding, network elements such as the UPF, the SMF, and the AMF of the core network are separately shown in the accompanying drawings. However, this shall not constitute any limitation on this application. A specific form of the network element of the core network is not limited in this application.

It may be understood that in an actual application, the term “multicast” may be replaced with “multicasting” below. For example, “multicast capability” may be replaced with “multicasting capability”, and “multicast session” may be replaced with “multicasting session”. This is not specifically limited in this application.

It may be further understood that, in this embodiment of this application, related descriptions about sending a message, information, or data by a network element A to a network element B, and receiving, by the network element B, the message, information, or data from the network element A are intended to describe a network element to which the message, information, or data is to be sent. Whether the message, information, or data is directly sent or indirectly sent through another network element is not limited.

It may be further understood that in this embodiment of this application, descriptions such as “when . . . ” and “if” all mean that a device (for example, a session management network element or a mobility management network element) in an objective case does not perform corresponding processing at a limited time and the device (for example, a session management network element or a mobility management network element) is not required to be bound to have an action of determining during implementation, and do not mean that another restriction exists.

Figure 4:
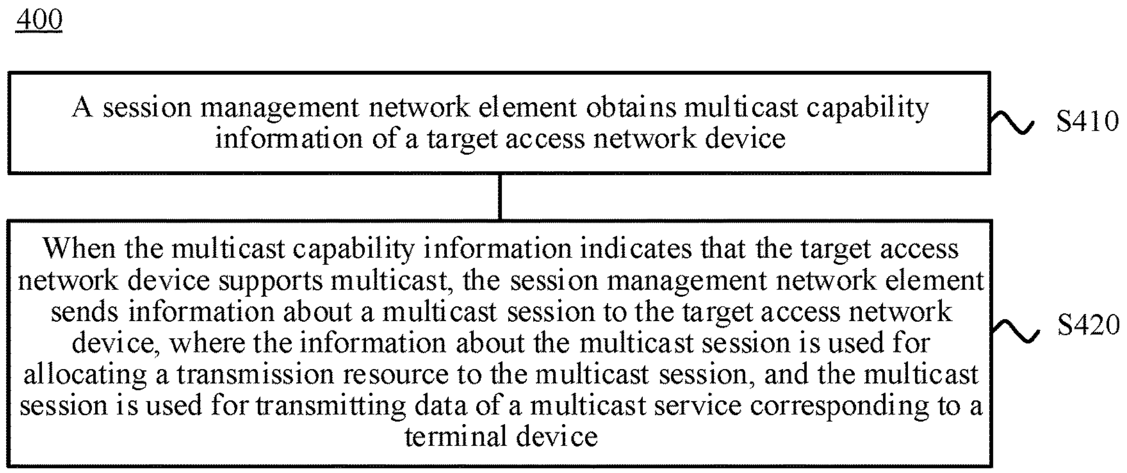
FIG. 4 is a schematic flowchart of a multicast service transmission method according to an embodiment of this application.

FIG. 4 is a schematic flowchart of a method 400 for transmitting a multicast service according to an embodiment of this application. The method 400 is applied to a scenario in which a terminal device moves from a source access network device to a target access network device. For example, the method 400 may be applied to a system architecture 100 shown in FIG. 1.

S410. A session management network element obtains multicast capability information of a target access network device.

The multicast capability information may be referred to as MBS capability information.

For example, the session management network element may obtain the multicast capability information of the target access network device from a mobility management network element, or locally obtain the multicast capability information of the target access network device from the session management network element.

The multicast capability information of the target access network device indicates whether the target access network device supports multicast (that is, a multicast transmission mode). An example in which 1 bit represents the multicast capability information of the target access network device is used for description. If a value of the 1 bit is 0, it indicates that multicast is not supported. If a value of the 1 bit is 1, it indicates that multicast is supported. This is not limited to this example.

Optionally, before S410, the method 400 further includes: The session management network element determines that the source access network device does not support multicast. Alternatively, S410 may be replaced with that the session management network element obtains the multicast capability information of the target access network device when the source access network device does not support multicast.

Specifically, if the source access network device does not support multicast, as described above, the session management network element cannot learn whether the target access network device supports multicast, and therefore needs to obtain the multicast capability information of the target access network device.

S420. When the multicast capability information indicates that the target access network device supports multicast, the session management network element sends information about a multicast session to the target access network device.

The information about the multicast session may be used for allocating a transmission resource to the multicast session, and the multicast session is used for transmitting data of a multicast service corresponding to the terminal device.

The multicast service corresponding to the terminal device may be understood as a multicast service currently performed by the terminal device. The multicast service may also be replaced with a multicasting service or a broadcast service.

Specifically, the information about the multicast session may include one or more of the following information: context information of the multicast session, a QoS parameter of the multicast session, an association relationship between a unicast session (or a QoS flow in the unicast session) and a multicast session (or a QoS flow in the multicast session), a QoS parameter of the unicast session, and identification information of the multicast session.

The QoS parameter of the multicast session may include a multicast QFI, the identification information of the multicast session, and the like. The identification information of the multicast session is used for identifying the multicast session. For example, the identification information of the multicast session may be a multicast group identifier (temporary multicast group identifier, TMGI) or a multicast session identifier (multicast broadcast service session ID).

"The information about the multicast session may be used for allocating the transmission resource to the multicast session" may be understood through the following example.

For example, if the information about the multicast session includes the QoS parameter of the multicast session, the target access network device may configure a radio bearer of the terminal device or configure a radio bearer resource of the multicast session based on the QoS parameter of the multicast session.

For another example, if the information about the multicast session includes the association relationship between the multicast session and the unicast session, and/or the association relationship between the QoS flow in the multicast session and the QoS flow in the unicast session, when the unicast session resource needs to be used for transmitting the multicast data (for example, when the terminal device accesses an access network device that does not support multicast), the target access network device may transmit, based on the association relationship through the transmission resource of a unicast session associated with the multicast session or a transmission resource of a unicast QoS flow associated with the multicast QoS flow, data of a multicast service corresponding to the terminal device.

It may be understood that the foregoing example in which the information about the multicast session is used for allocating the transmission resource to the multicast session is merely for ease of understanding, and this application is not limited thereto.

In the scenario in which the terminal device moves from the source access network device to the target access network device, when the source access network device does not support multicast, if the session management network element cannot learn multicast capability information of the target access network device, unicast transmission is still performed when the session management network element supports multicast, which causes a resource waste (for example, air interface resources and transmission network side resources). In this embodiment of this application, the session management network element obtains the multicast capability information of the target access network device, and sends the information about the multicast session to the target access network device when the multicast capability information indicates that the target access network device supports multicast. Therefore, the target access network device establishes a resource for multicast transmission, which can prevent the resource waste and help save resources.

The session management network element may obtain the multicast capability information of the target access network device through different implementations, which are respectively described in detail below.

In a first case, S410 includes: The session management network element obtains the multicast capability information based on an identifier of the target access network device and a first correspondence, where the first correspondence includes a correspondence between the identifier of the target access network device and the multicast capability information.

Specifically, the session management network element locally stores a correspondence between the identifier of the target access network device and the multicast capability information of the identifier of the target access network device. The session management network element locally queries the correspondence based on the identifier (for example, a RAN ID) of the target access network device, to obtain the multicast capability information of the target access network device.

It may be understood that a correspondence between the identifier of the target access network device and the multicast capability information of the target access network device is used as an example for description herein. However, this application is not limited thereto. Actually, the session management network element may locally store multicast capability information of a plurality of access network devices. For example, a multicast capability information list is maintained in the session management network element. Based on the identifier of the access network device, the session management network element may query multicast capability information of a corresponding access network device in the multicast capability information list.

In a second case, S410 includes: The mobility management network element sends the multicast capability information of the target access network device to the session management network element. Correspondingly, the session management network element receives the multicast capability information of the target access network device from the mobility management network element.

It may be understood that the multicast capability information of the target access network device that is sent by the mobility management network element to the session management network element may be carried in an existing interface message, or may be a newly defined message. This is not limited. For example, the multicast capability information of the target access network device may be carried in an N11 interface message.

Before sending the multicast capability information of the target access network device to the session management network element, the mobility management network element may first obtain the multicast capability information of the target access network device. An occasion on which the mobility management network element obtains the multicast capability information of the target access network device is not specifically limited in this application. When the terminal device moves from the source access network device to the target access network device, the mobility management network element may receive the multicast capability information sent by the target access network device. Alternatively, before the terminal device moves from the source access network device to the target access network device, the mobility management network element may interact with the target access network device in advance to obtain the multicast capability information of the target access network device. For example, the mobility management network element may exchange device level information (including multicast capability information, load information, and the like of the access network device) with the target access network device.

In an optional implementation, the sending, by the mobility management network element, the multicast capability information of the target access network device to the session management network element includes: When the terminal device currently performs a multicast service, the mobility management network element sends the multicast capability information of the target access network device to the session management network element. Alternatively, the mobility management network element sends the multicast capability information of the target access network device to the session management network element when determining that the terminal device is currently performing a multicast service.

A manner in which the mobility management network element learns that the terminal device is currently performing a multicast service is not specifically limited in this application. The mobility management network element may learn, in the following manner, that the terminal device is currently performing a multicast service.

Manner 1: The mobility management network element interacts with an access network device in which the terminal device is located, to learn that the terminal device is currently performing a multicast service.

Manner 2: The mobility management network element learns, through the stored context of the terminal device, that the terminal device is currently performing a multicast service. The context of the terminal device includes multicast-related information. The multicast-related information includes one or more of the following information: identification information of a multicast session, identification information of a multicast session management network element, a QoS parameter of the multicast session, or another piece of information used for identifying a multicast service.

Manner 3: The mobility management network element receives a notification from the terminal device, where the notification is used for notifying the mobility management network element that the terminal device is currently performing the multicast service.

It may be understood that the foregoing three manners are merely examples for description, and this application is not limited thereto.

In still another possible implementation, optionally, the method 400 further includes: A mobility management network element obtains identification information of a multicast session, where the multicast session is used for transmitting data of a multicast service corresponding to a terminal device. That the mobility management network element sends the multicast capability information of the target access network device to the session management network element includes: The mobility management network element sends the multicast capability information of the target access network device to the session management network element based on the identification information of the multicast session.

After obtaining the identification information of the multicast session, the mobility management network element may send the multicast capability information of the target access network device to the session management network element.

Optionally, that a mobility management network element obtains identification information of a multicast session includes: The mobility management network element obtains the identification information of the multicast session through multicast context information of a terminal device.

Specifically, if the terminal device previously joins a multicast group (one multicast group may include one or more terminal devices), the mobility management network element may store multicast context information of the terminal device, and the multicast context information of the terminal device includes identification information (for example, an MBS session ID) of a multicast session. The mobility management network element may obtain the identification information of the multicast session from the stored multicast context information of the terminal device.

Optionally, in addition to the identification information of the multicast session, the mobility management network element may further obtain another related information of the multicast session, and then send the multicast capability information of the target access network device to the session management network element based on the another related information of the multicast session. For example, another related information of the multicast session may include one or more of the following: a PDU session of the terminal device, an identifier of an access network device used for the multicast session, an identifier of a session management network element used for the multicast session, a QoS parameter of the multicast session, or another information used for identifying a multicast service. The PDU session is associated with the multicast session. It may be understood that information included in another related information of the multicast session may be understood as having a binding relationship or a correspondence. When obtaining one or more of the information, the mobility management network element may send the multicast capability information of the target access network device to the session management network element.

In this embodiment of this application, the mobility management network element may actively send the multicast capability information of the target access network device to the session management network element, or may send the multicast capability information of the target access network device to the session management network element based on a query request sent by the session management network element. This is not limited.

In a possible implementation, optionally, the method 400 further includes: The session management network element sends a query request to the mobility management network element, where the query request is used for requesting the multicast capability information of the target access network device. Correspondingly, the mobility management network element receives the query request.

The query request may also be understood as being used for querying multicast capability information of an access network device currently accessed by the terminal device. A handover scenario is used as an example. If the terminal device moves to the target access network device, the access network device currently accessed by the terminal device is the target access network device. The session management network element can learn that the terminal device moves to the target access network device. Alternatively, the session management network element learns the access network device to which the terminal device currently accesses or on which the terminal device is currently camped.

It may be understood that the query request itself has a function of querying the multicast capability information of the target access network device, or the query request carries a related identifier of the target access network device, which is used for querying the multicast capability information of the target access network device. This is not limited.

For example, the query request may include an identifier of the terminal device. Because the mobility management network element can learn the access network device currently accessed by the terminal device, after receiving the query request that includes the identifier of the terminal device, the mobility management network element may feed back multicast capability information of the access network device currently accessed by the terminal device to the session management network element.

For another example, the query request may include an identifier of the target access network device. After receiving the query request that includes the identifier of the terminal device, the mobility management network element may feed back the multicast capability information of the target access network device to the session management network element.

In the embodiments described above, the session management network element first obtains the multicast capability information of the target access network device, and then sends the information about the multicast session to the target access network device only when the target access network device supports multicast. This application further provides an embodiment. The session management network element first sends the information about the multicast session to the target access network device, and then learns whether the target access network device supports multicast. In other words, before sending the information about the multicast session, the session management network element does not obtain the multicast capability information of the target access network device, that is, the session management network element does not learn whether the target access network device supports multicast. A description is given below with reference to FIG. 5. It should be noted that, a difference between the embodiment shown in FIG. 4 and the embodiment shown in FIG. 5 below lies in at least that "the session management network element sends the information about the multicast session" at different times.

Figure 5:
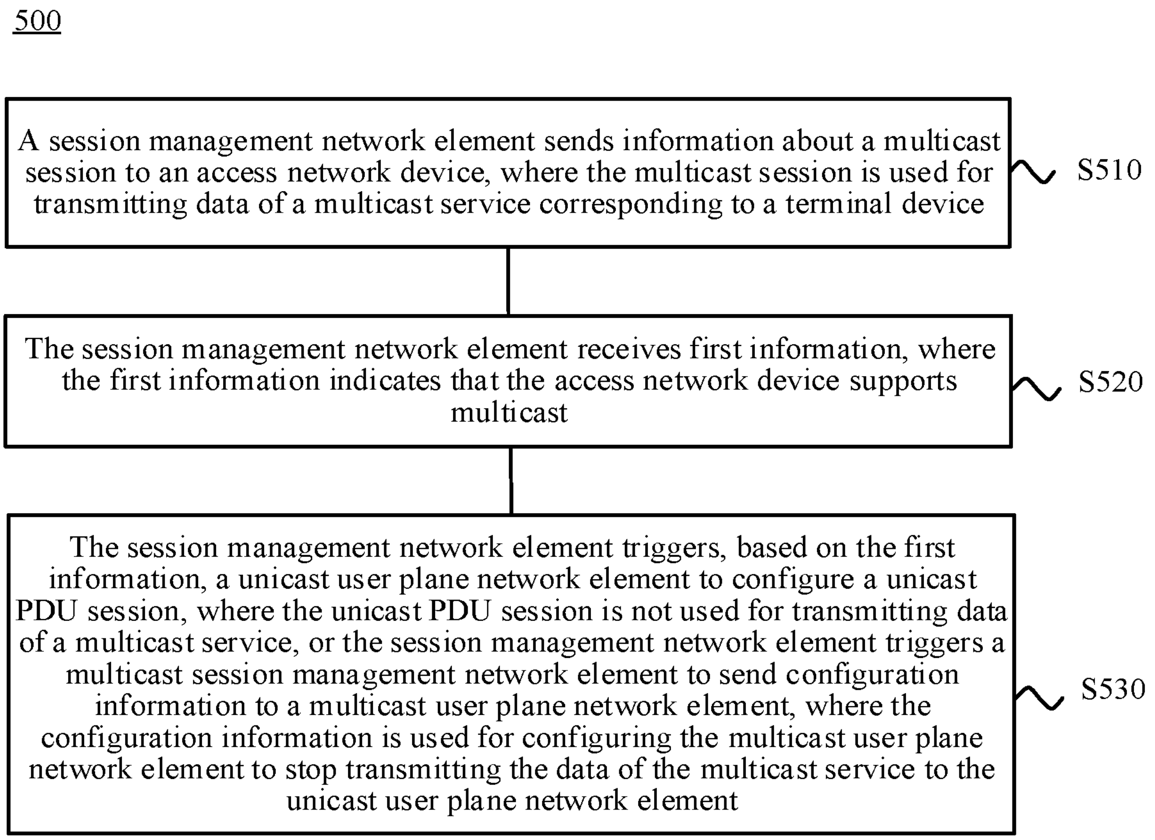
FIG. 5 is a schematic flowchart of another multicast service transmission method according to an embodiment of this application.

FIG. 5 is a schematic flowchart of a method 500 for transmitting a multicast service according to an embodiment of this application. For example, the method 500 may be applied to a system architecture 100 shown in FIG. 1. The method 500 includes the following steps.

S510. A session management network element sends information about a multicast session to an access network device.

The information about the multicast session may be used for allocating a transmission resource to the multicast session, and the multicast session is used for transmitting data of a multicast service corresponding to the terminal device. Correspondingly, the access network device receives the information about the multicast session.

For the information about the multicast session, reference is made to the foregoing description. For brevity, details are not described herein.

Specifically, the session management network element sends the information about the multicast session to the access network device through a mobility management network element.

S520. The access network device sends first information to the session management network element, where the first information indicates that the access network device supports multicast. Correspondingly, the session management network element receives the first information.

Specifically, the access network device sends the first information to the session management network element through the mobility management network element.

The first information may be an acknowledgment (ACK), or may be indication information (the indication information indicates that the access network device supports multicast), or may be a cell in some messages, or the like, which is not limited thereto.

For example, if the access network device supports multicast, the access network device feeds back acknowledgment information established by a multicast resource.

For another example, if the access network device supports multicast, the message fed back by the access network device includes the acknowledgment information established by the multicast resource. If the session management network element receives the acknowledgment information established by the multicast resource, it is considered that the access network device supports multicast.

S530. The session management network element triggers, based on the first information, a unicast user plane network element to configure a unicast PDU session, where the unicast PDU session is not used for transmitting data of a multicast service. Alternatively, the session management network element triggers a multicast session management network element to send configuration information to a multicast user plane network element, where the configuration information is used for configuring the multicast user plane network element to stop transmitting the data of the multicast service to the unicast user plane network element.

The unicast user plane network element may be a user plane network element used for unicast transmission. The multicast user plane network element may be a user plane network element used for multicast transmission. The multicast session management network element may be a network element that manages a multicast session, and may configure the multicast user plane network element to send multicast data.

Specifically, the session management network element configures the unicast user plane network element based on the first information, to implement at least one of the following functions: the unicast user plane network element does not forward the multicast data through the unicast PDU session after receiving the multicast data (that is, the data of the multicast service), the unicast user plane network element may directly discard the received multicast data, or receives but does not forward the multicast data. A manner in which the session management network element configures the unicast user plane network element to implement the foregoing functions is not limited in this application. For example, the session management network element may implement the foregoing steps by updating a forwarding rule of the unicast user plane network element, or may notify the unicast user plane network element through a notification message. This is not limited.

The following example may be used for understanding that the session management network element triggers the unicast user plane network element to configure the unicast PDU session.

For example, the session management network element sends a second message to the unicast user plane network element, where the second message includes third information. The third information is used for configuring a data processing rule of the unicast user plane network element. The data processing rule includes one or more of the following aspects: a rule related to data identification, a rule related to data forwarding, a rule related to data QoS, and the like. After receiving the configuration information, the unicast user plane network element performs gating based on the data processing rule, or does not forward the data of the multicast service to the unicast PDU session of the terminal device.

For another example, the session management network element sends a third message to the unicast user plane network element, where the third message includes fourth information. The fourth information indicates that the unicast user plane network element sends a leave message (for example, to a multicast user plane network element). The leave message is used for enabling the unicast user plane network element to no longer receive data of the multicast service.

It may be understood that a message or signaling involved in the foregoing example about "the session management network element triggering a unicast user plane network element to configure a unicast PDU session" may be an existing message or signaling, or may be a newly defined message or signaling. This is not limited in this application.

Alternatively, specifically, the session management network element may send a request message to the multicast session management network element, where the request message is used for requesting the multicast session management network element to send configuration information to the multicast user plane network element, and the configuration information is used for configuring the multicast user plane network element not to send the multicast data to the unicast user plane network element. A manner in which the multicast session management network element configures the multicast user plane network element to implement the foregoing functions is not limited in this application either. For example, the multicast session management network element may implement the foregoing function by updating a forwarding rule of the multicast user plane network element, or may notify the multicast user plane network element through a notification message. This is not limited.

That the session management network element triggers the multicast session management network element to send configuration information to the multicast user plane network element may be understood through the following example.

For example, the session management network element sends the fourth message to the multicast session management network element. The fourth message is used for requesting the multicast user plane network element not to send the data of the multicast service to the unicast user plane network element. After receiving the fourth message, the multicast session management network element may send a fifth message to the multicast user plane network element. The fifth message includes sixth information, where the sixth information is used for configuring or updating a data processing rule of the multicast user plane network element. The data processing rule includes one or more of the following aspects: a rule related to data identification, a rule related to data forwarding, a rule related to data QoS, and the like. The multicast user plane network element may perform gating according to the data processing rule, or does not send the data of the multicast service to the unicast user plane network element. Optionally, the multicast user plane network element may delete the forwarding rule from the multicast user plane network element to the unicast user plane network element, so as to implement a function of not sending the data of the multicast service to the unicast user plane network element. The sixth information may be replaced with the configuration information.

It may be understood that the message or signaling involved in the foregoing example about "the session management network element triggering the multicast session management network element to send configuration information to the multicast user plane network element" may be an existing message or signaling, or may be a newly defined message or signaling. This is not limited in this application. In this embodiment of this application, the session management network element sends the information about the multicast session to the access network device, to test whether the access network device supports multicast. If the access network device supports multicast, the session management network element establishes a resource for multicast transmission, which can prevent the resource waste and help save resources.

Optionally, the method 500 further includes: The session management network element triggers, based on the first information, establishment of a multicast path between a user plane network element (that is, the foregoing multicast user plane network element) corresponding to the multicast session and the access network device.

The multicast path is also referred to as a multicast tunnel, and has a corresponding tunnel identifier. If the session management network element learns that the access network device supports multicast, the session management network element may trigger establishment of the multicast path between the user plane network element corresponding to the multicast session and the access network device. A specific establishment process uses a current path establishment technology.

That the session management network element triggers establishment of the multicast path between the user plane network element corresponding to the multicast session and the access network device may be understood through the following example.

For example, the session management network element sends N2 information to the access network device, where the N2 information is used for requesting the access network device to establish a tunnel. After obtaining the N2 information, the access network device may allocate a tunnel identifier. The tunnel identifier is configured to identify a multicast path. The access network device sends the tunnel identifier to a multicast session management network element. After receiving the tunnel identifier, the multicast session management network element sends the tunnel identifier to the multicast user plane network element.

The access network device may not support multicast either. When the access network device does not support multicast, the access network device may notify the session management network element that the access network device does not support multicast. Correspondingly, the session management network element may learn, in different manners, that the access network device does not support multicast.

In a possible implementation, optionally, the method 500 further includes: The access network device sends second information to a session management network element if the access network device does not support multicast, where the second information indicates that the access network device does not support multicast. In other words, if the access network device does not support multicast, the session management network element may be notified through the second information.

The second information may be a negative acknowledgment (NACK), may be indication information (the indication information indicates that the access network device does not support multicast), may be a cell in some messages (the cell indicates that the access network device does not support multicast), or the like. This is not limited.

For example, if the access network device does not support multicast, the message fed back by the access network device includes a cause value, where the cause value indicates that the access network device receives a parameter that cannot be identified or cannot be processed currently. If the session management network element receives the cause value, it is considered that the access network device does not support multicast.

Alternatively, the access network device may indirectly indicate, in a manner of not sending some messages to the mobility management network element, that the access network device does not support multicast. For example, if the access network device does not support multicast, the message fed back by the access network device to the mobility management network element does not include the acknowledgment information established by the multicast resource. If the session management network element does not receive the acknowledgment information established by the multicast resource, it is considered that the access network device does not support multicast.

A person skilled in the art may understand that the first information and the second information are introduced only for ease of describing different cases, limit cannot be followed by "supporting multicast" and "not supporting multicast" being implemented through two cells, and limit cannot be followed by a quantity of information either. For example, the first information and the second information may be combined into a same indication, and the indication is implemented through one bit. When a value of the bit is 0, it indicates that multicast is supported, and when a value of the bit is 1, it indicates that the multicast is not supported.

In another possible implementation, before S510, the method 500 further includes: The session management network element determines that at least one of the following conditions is met: the session management network element does not include multicast capability information of the access network device locally, or the session management network element determines that the access network device does not support multicast.

For example, if the session management network element locally stores no multicast capability information of the access network device, and the session management network element does not learn whether the access network device supports multicast, the session management network element may send the information about the multicast session to the access network device, to test whether the access network device supports multicast.

It may be understood that the foregoing examples are merely examples for description, and are not intended to constitute a limitation on this embodiment of this application.

A scenario of the foregoing method 500 is not specifically limited in this application. In a possible implementation, the method 500 may also be applied to a scenario in which a terminal device moves from a source access network device to a target access network device. When the method 500 is applied to the scenario in which the terminal device moves from the source access network device to the target access network device, the access network device in the method 500 is the target access network device.

Optionally, before S510, the method 500 further includes: The session management network element determines that at least one of the following conditions is met: the source access network device does not support multicast, the session management network element does not include multicast capability information of the target access network device locally, or the session management network element does not include multicast capability information of the source access network device locally.

For example, if the session management network element locally stores no multicast capability information of the target access network device, and the session management network element does not learn whether the target access network device supports multicast, the session management network element may send the information about the multicast session to the target access network device, to test whether the target access network device supports multicast.

For another example, if the session management network element does not store the multicast capability information of the source access network device locally, the session management network element does not learn whether the source access network device supports multicast, and does not learn whether the target access network device supports multicast. In this case, the session management network element may send the information about the multicast session to the target access network device, to test whether the target access network device supports multicast.

For another example, it can be learned from the foregoing description that, when the source access network device does not support multicast, the session management network element cannot obtain multicast-related information from the source access network device, and therefore cannot learn whether the target access network device supports multicast. In this case, the session management network element may send the information about the multicast session to the target access network device, to test whether the target access network device supports multicast.

It may be understood that the foregoing examples are merely examples for description, and are not intended to constitute a limitation on this embodiment of this application.

Figure 6:
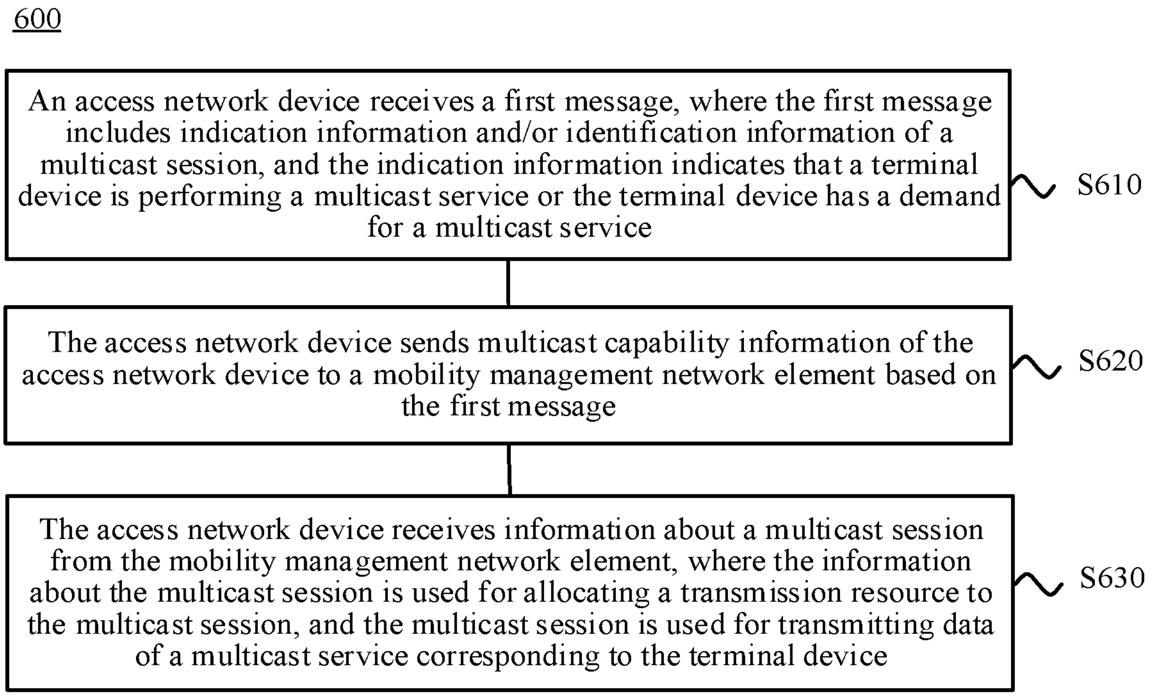
FIG. 6 is a schematic flowchart of another multicast service transmission method according to an embodiment of this application.

FIG. 6 is a schematic flowchart of a method 600 for transmitting a multicast service according to an embodiment of this application. For example, the method 600 may be applied to a system architecture 100 shown in FIG. 1. The method 600 includes the following steps.

S610. A terminal device sends a first message to an access network device.

The first message may include indication information and/or identification information of a multicast session, where the indication information indicates that the terminal device is performing a multicast service or the terminal device has a demand for a multicast service.

Correspondingly, the access network device receives the first message.

In a specific implementation, the method 600 may include: A terminal device generates a first message.

Specifically, the terminal device determines, depending on whether a multicast service exists (for example, a multicast service is being performed, or a demand for the multicast service exists), whether to send the indication information and/or the identification information of the multicast session to the access network device.

The identification information of the multicast session is used for identifying the multicast session. For example, the identification information of the multicast session is an MBS session ID.

S620. The access network device sends multicast capability information of the access network device to a mobility management network element based on the first message.

Correspondingly, the mobility management network element receives the multicast capability information of the access network device.

Further, the mobility management network element sends the multicast capability information of the access network device to the session management network element.

In S620, the access network device sends the multicast capability information to the mobility management network element regardless of whether the access network device supports multicast, where the multicast capability information indicates whether the access network device supports multicast. Alternatively, in S620, the access network device sends the multicast capability information to the mobility management network element only when the access network device supports multicast, where the multicast capability information indicates that the access network device supports multicast.

Another implementation of step S620 is that when the access network device supports multicast, the access network device sends indication information to the mobility management network element, where the indication information comes from the first message sent by the terminal device to the access network device. In other words, the access network device may transparently transmit the indication information in S610 to the mobility management network element.

Another implementation of step S620 is that when the access network device supports multicast, the access network device sends the identification information of the multicast session to the mobility management network element, where the identification information of the multicast session comes from the first message sent by the terminal device to the access network device. In other words, the access network device may transparently transmit the identification information of the multicast session in S610 to the mobility management network element.

After the mobility management network element obtains one or more of the following information: the multicast capability information of the access network device, the identification information of the multicast session, or the indication information, the multicast capability information of the access network device may be sent to the session management network element. Correspondingly, the session management network element receives the multicast capability information from the mobility management network element.

For an action of the session management network element after obtaining the multicast capability information of the access network device, refer to the description of S420 in the foregoing method 400. For example, when the multicast capability information indicates that the access network device supports multicast, the session management network element sends the information about the multicast session to the mobility management network element. Correspondingly, the mobility management network element receives the information about the multicast session.

S630. The mobility management network element sends the information about the multicast session to the access network device.

The information about the multicast session may be used for allocating a transmission resource to the multicast session, and the multicast session is used for transmitting data of a multicast service corresponding to the terminal device.

Correspondingly, the access network device receives the information about the multicast session from the mobility management network element.

For the information about the multicast session, refer to the description of the foregoing embodiment. For brevity, details are not described herein.

In this embodiment of this application, the terminal device notifies the access network device that the terminal device currently has to-be-transmitted multicast data. If the access network device supports multicast, the access network device may notify the session management network element of multicast capability information of the access network device. In this way, when subsequently learning that the access network device supports multicast, the session management network element may establish a transmission path for multicast data, which helps establish a multicast transmission resource in a timely manner, and prevents a resource waste caused by a failure to establish a multicast transmission resource in a timely manner when an excessively large number of users receive multicast data.

The access network device in the foregoing method 600 may be used as a target access network device in a handover scenario. If the terminal device is handed over from the source access network device to the target access network device, S610 may include the following steps. The terminal device may send the first message to the target access network device, to notify the target access network device that the terminal device is performing a multicast service or the terminal device has a demand for a multicast service. In this case, the first message may be a handover confirm message in the handover scenario.

Further, the handover confirm message may be included in an RRC reconfiguration message.

Correspondingly, S620 includes the following step. The access network device may send the multicast capability information of the target access network device to the mobility management network element through a path switch request message. Specifically, for example, the multicast capability information of the access network device may be included in an NG SETUP REQUEST message or a RAN CONFIGURATION UPDATE message that is sent by the access network device to the mobility management network element.

Correspondingly, S630 includes the following step. The mobility management network element sends a path switch request acknowledgment (Path Switch Request ACK) message to the access network device, where the path switch request acknowledgment message includes the information about the multicast session.

Regardless of a handover scenario, the first message may be an RRC reconfiguration (RRCReconfigurationComplete) message sent by the terminal device to the access network device.

It should be understood that the method 600 and the foregoing method 400 may be combined for implementation, or may be an independent embodiment. This is not limited in this application.

Figure 7:
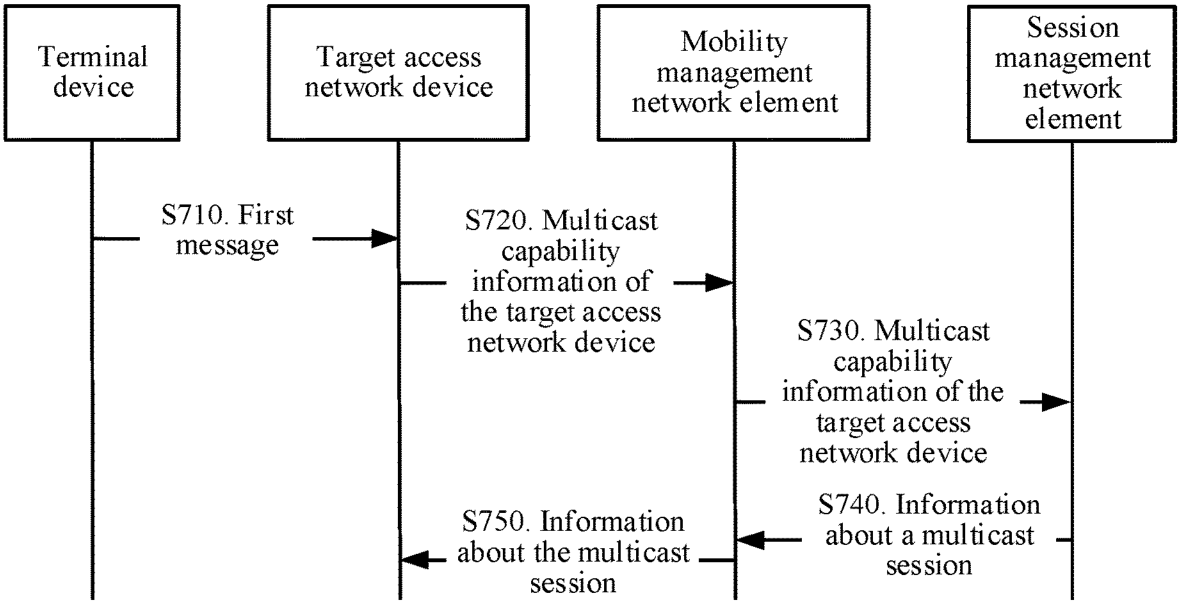
FIG. 7 is a schematic flowchart of another multicast service transmission method according to an embodiment of this application.

It is assumed that the access network device in the method 600 is a target access network device, and the method 600 is implemented in combination with the foregoing method 400. The schematic interaction process in FIG. 7 is used as an example. As shown in FIG. 7, the method 700 includes the following steps.

S710. A terminal device sends a first message to a target access network device.

S710 is similar to S610, and details are not described herein again.

S720. The target access network device sends multicast capability information of the target access network device to a mobility management network element based on the first message.

S720 is similar to S620, and details are not described herein again.

S730. The mobility management network element sends the multicast capability information of the target access network device to a session management network element.

S740. The session management network element sends information about a multicast session to the mobility management network element.

The information about the multicast session may be used for allocating a transmission resource to the multicast session, and the multicast session is used for transmitting data of a multicast service corresponding to the terminal device. Correspondingly, the access network device receives the information about the multicast session from the mobility management network element.

S750. The mobility management network element sends the information about the multicast session to the access network device.

S750 is similar to S630, and details are not described herein again.

The method 700 shown in FIG. 7 is an example in which the foregoing method 400 and the method 600 are implemented in combination. However, this application is not limited thereto.

For ease of understanding, embodiments of this application are described in detail below with reference to FIG. 8 to FIG. 11. In the accompanying drawings below, a source access network (source RAN, S-RAN) may correspond to a source access network device, a target access network (target RAN, T-RAN) may correspond to a target access network device, an AMF may correspond to a mobility management network element, an SMF may correspond to a session management network element, and a UPF may correspond to a user plane network element. In the following example, it is assumed that the UE moves from an S-RAN to a T-RAN, where the S-RAN does not support multicast. An involved handover procedure is only briefly described. For a specific handover procedure, refer to the existing description.

Figure 8:
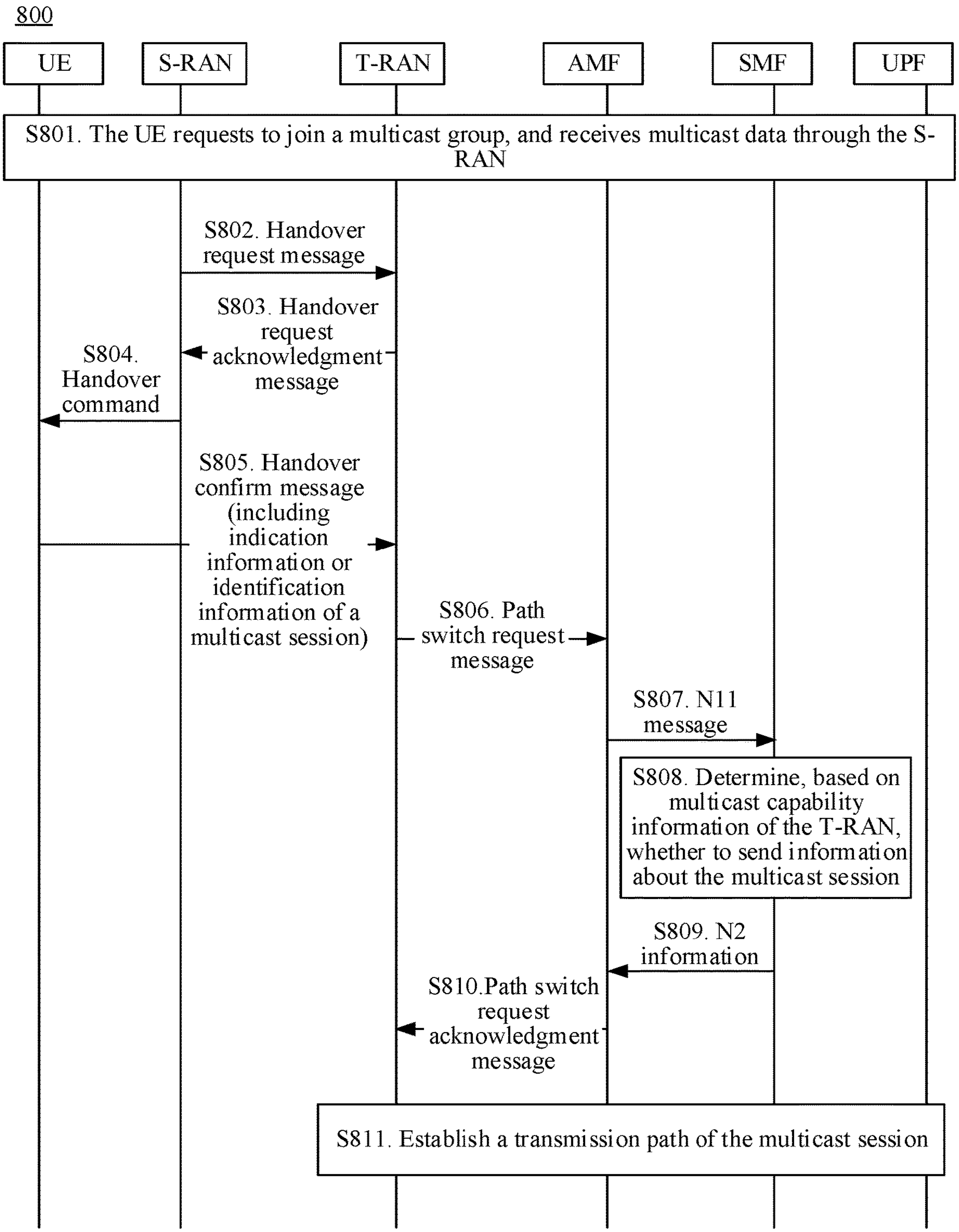
FIG. 8 is a schematic flowchart of another multicast service transmission method according to an embodiment of this application.

FIG. 8 is another schematic flowchart of a method 800 for transmitting a multicast service according to an embodiment of this application. The method 800 may be applied to the system architecture shown in FIG. 1. The method 800 includes the following steps.

S801. A UE requests to join a multicast group, and receives multicast data through an S-RAN.

Because the S-RAN does not support multicast, a core network sends the multicast data to the UE in a unicast mode.

Optionally, an SMF may record that the S-RAN does not support multicast.

S802. The S-RAN sends a handover request message to a T-RAN.

The handover request message includes information of a unicast session context. The S-RAN does not support multicast. Therefore, the S-RAN does not store any multicast information.

S803. The T-RAN sends a handover request acknowledgment (Handover Request ACK) message to the S-RAN.

The handover request acknowledgment message also includes only the information about the unicast session context. Specifically, the T-RAN determines, based on local conditions, whether to establish all unicast resources or only some unicast resources.

S804. The S-RAN sends a handover command to the UE. The handover command may be carried by an RRC message.

After receiving the handover command sent by the S-RAN, the UE determines, depending on whether a multicast service is being performed locally or a demand for a multicast service exists, whether to send indication information to the T-RAN, so as to notify the T-RAN whether the UE is currently performing a multicast service or has the demand for the multicast service.

S805. The UE sends a handover confirm message to the T-RAN. The handover confirm message includes indication information. The indication information indicates that the UE is performing a multicast service or has the demand for the multicast service. Alternatively, the handover confirm message includes identification information of a multicast session.

Optionally, the handover confirm message may also be an RRC message.

S806. The T-RAN sends a path switch request message to an AMF. The path switch request message includes multicast capability information of the T-RAN, where the multicast capability information indicates that the T-RAN supports multicast. Alternatively, the path switch request message includes the indication information included in the handover confirm message by the UE, that is, the indication information in S805. Alternatively, the path switch request message includes the identification information of the multicast session that is included in the handover confirm message by the UE.

Specifically, the T-RAN determines, based on indication information of the UE or the identification information of the multicast session, that the UE has the demand for the multicast service. This is because the T-RAN supports multicast. Therefore, the T-RAN may identify the indication information of the UE or the identification information of the multicast session. If the T-RAN does not support multicast like the S-RAN, the T-RAN cannot identify the indication information of the UE or the identification information of the multicast session.

S807. The AMF sends an N11 message to the SMF.

The N11 message includes the multicast capability information of the T-RAN.

The AMF may transparently transmit the multicast capability information of the T-RAN, the indication information, or the identification information of the multicast session (that is, the RAN directly sends the information to the SMF through the AMF, but the AMF does not parse the information) to the SMF, or the AMF parses the multicast capability information of the T-RAN, and then the N11 message sent to the SMF includes the multicast capability information of the T-RAN.

S808. After receiving the multicast capability information of the T-RAN, the indication information, or the identification information of the multicast session, the SMF determines, based on the multicast capability information of the T-RAN, whether the information about the multicast session needs to be sent to the T-RAN.

If it is learned that the T-RAN supports multicast, the SMF provides the information about the multicast session to the T-RAN. If the multicast capability information of the T-RAN indicates that the T-RAN does not support multicast, the SMF does not need to send the information about the multicast session to the T-RAN.

S809. The SMF sends N2 information to the AMF.

The N2 information includes the information about the multicast session. For the information about the multicast session, refer to the description of the foregoing embodiment.

S810. The AMF sends a path switch request acknowledgment message to the T-RAN.

The path switch request acknowledgment message includes the information about the multicast session that is sent by the SMF to the AMF in S809.

S811. The SMF triggers establishment of a transmission path of the multicast session.

If the T-RAN supports multicast, the SMF sends the N2 information to the T-RAN when the UE has a demand for multicast data. In this way, the T-RAN may learn, through the N2 information, that the demand for the multicast data exists, and may further establish the transmission path (or a tunnel) of the multicast session.

A process of establishing the transmission path of the multicast session is briefly described herein with reference to an example.

For example, after receiving the N2 information, the T-RAN may allocate a tunnel identifier. The tunnel identifier is configured to identify a multicast path (that is, the transmission path of the multicast session). The T-RAN sends the tunnel identifier to a multicast and broadcast (MB) session management function (multicast and broadcast (MB) session management function, MB-SMF) (the network element is not shown in the figure). The tunnel identifier may include IP address information. Optionally, the tunnel identifier may be included in an MBS session resource setup required message. After receiving the tunnel identifier, the MB-SMF sends the tunnel identifier to a multicast and broadcast (MB) user plane function (multicast and broadcast (MB) user plane function, MB-UPF) (the network element is not shown in the figure) through a sixth message. The MB-UPF establishes a multicast path with the T-RAN based on the tunnel identifier.

Optionally, the sixth message further includes configuration information of multicast data. The configuration information of the multicast data is used for configuring an identification or forwarding rule of the MB-UPF for the multicast data (for example, a packet detection rule (PDR)) or a forwarding action rule (FAR). The MB-UPF sends a response message for the sixth message to the MB-SMF. Optionally, the MB-SMF sends QoS information of the multicast session to the T-RAN after receiving the response message for the sixth message. After receiving the QoS information of the multicast session, the T-RAN sends an acknowledgment message to the MB-SMF.

The QoS information of the multicast session may include one or more of the following: a QoS flow identifier, an allocation and preemption priority, a packet error rate, a packet delay budget, a guaranteed flow bit rate, and the like of the multicast session.

Optionally, the QoS information of the multicast session may be included in an MBS session resource setup request message.

Optionally, the acknowledgment message may be an MBS session resource setup response message.

A person skilled in the art may learn the process of establishing the transmission path of the multicast session through the foregoing interaction examples of the T-RAN, the MB-SMF, and the MB-SMF. It may be understood that the foregoing examples constitute no limitation on the protection scope of embodiments of this application.

In the method 800, the UE notifies the T-RAN that the UE currently performs a multicast service. After learning that the UE currently performs the multicast service, the T-RAN reports the multicast capability information of the T-RAN to the SMF, so that the SMF establishes a multicast resource.

Figure 9:
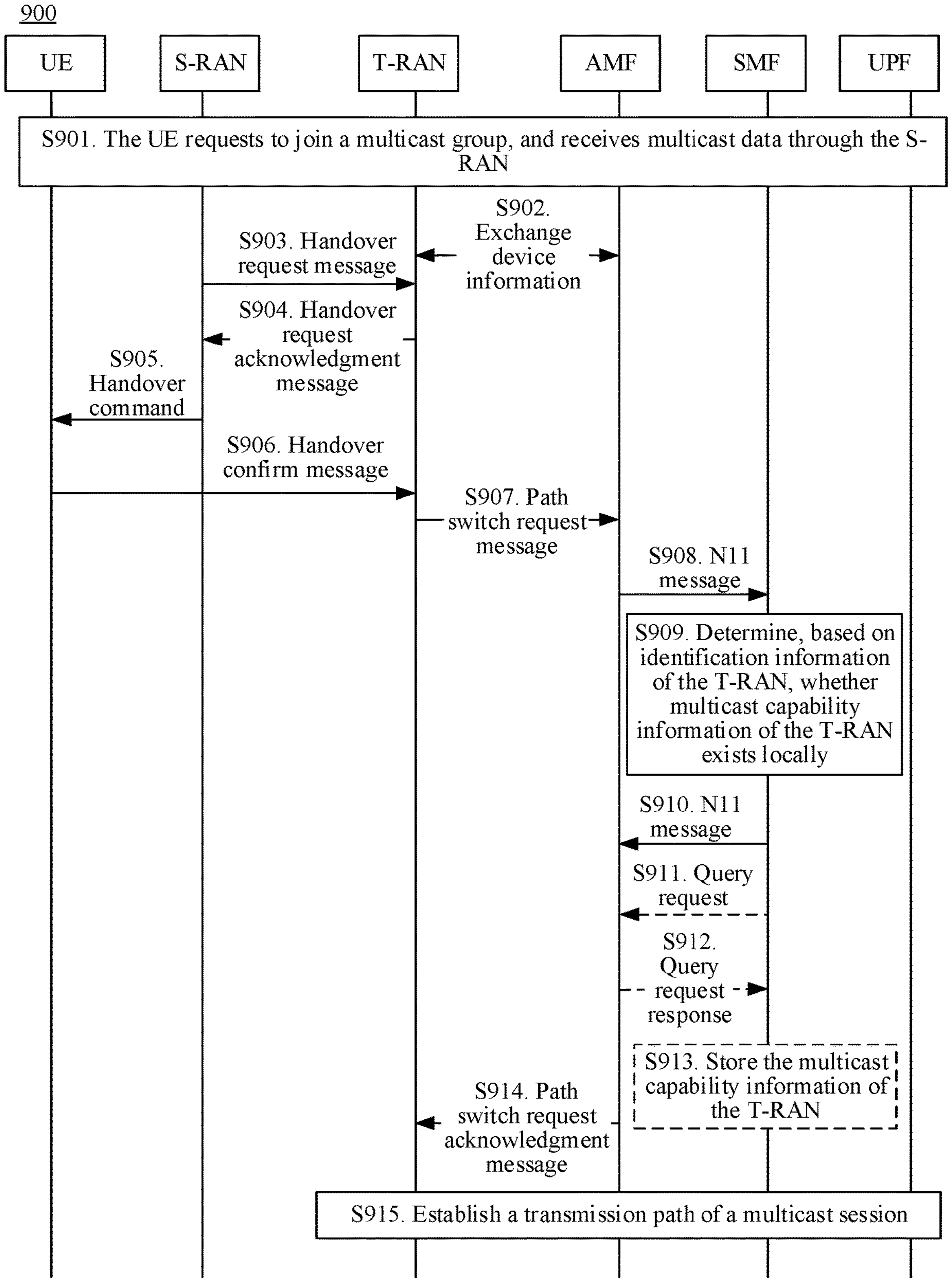
FIG. 9 is a schematic flowchart of another multicast service transmission method according to an embodiment of this application.

FIG. 9 is another schematic flowchart of a method 900 for transmitting a multicast service according to an embodiment of this application. The method 900 may be applied to the system architecture shown in FIG. 1. The method 900 includes the following steps.

S901. A UE requests to join a multicast group, and receives multicast data through an S-RAN.

Because the S-RAN does not support multicast, a core network sends the multicast data to the UE in a unicast mode.

Optionally, an SMF may record that the S-RAN does not support multicast.

S902. An AMF exchanges device information with a T-RAN.

The AMF interacts with the T-RAN to obtain multicast capability information of the T-RAN. The multicast capability information indicates that the T-RAN supports multicast.

S903. The S-RAN sends a handover request message to a T-RAN.

The handover request message includes information of a unicast session context.

The S-RAN does not support multicast. Therefore, the S-RAN does not store any multicast information.

The T-RAN supports multicast. However, because the handover request message sent by the S-RAN includes only the unicast session context, even if the T-RAN supports multicast, information about a multicast session cannot be obtained. The T-RAN does not know whether the UE is performing a multicast service.

S904. The T-RAN sends a handover request acknowledgment (Handover Request ACK) message to the S-RAN.

The handover request acknowledgment message also includes only the information about the unicast session context. Specifically, the T-RAN determines, based on local conditions, whether to establish all unicast resources or only some unicast resources.

S905. The S-RAN sends a handover command to the UE.

The handover command may be carried by an RRC message.

S906. The UE sends a handover confirm message to the T-RAN.

A difference from S805 in the method 800 lies in that the handover acknowledgment message in S906 does not include indication information sent by the UE to the T-RAN.

S907. The T-RAN sends a path switch request message to an AMF.

The path switch request message includes location information of the T-RAN. The location information includes identification information of the T-RAN, for example, a RAN ID.

S908. The AMF sends an N11 message to the SMF.

The N11 message includes the location information of the T-RAN.

S909. The SMF determines, based on the identification information of the T-RAN, whether the multicast capability information of the T-RAN exists locally.

Specifically, the SMF may locally store the RAN ID and multicast capability information of the RAN that corresponds to the RAN ID. The SMF queries, based on the identification information of the T-RAN, whether the multicast capability information of the T-RAN exists locally. If the multicast capability information of the T-RAN exists in the SMF locally, S910 is directly performed. If the multicast capability information of the T-RAN does not exist in the SMF locally, S911 and S912 are first performed, and then S910 is performed.

S910. The SMF sends an N11 message to the AMF.

If the T-RAN supports multicast and the UE is performing the multicast service, the SMF carries the information about the multicast session in the N11 message.

S911. The SMF sends a query request to the AMF.

The query request includes the identification information of the T-RAN.

S912. The AMF sends a query request response to the SMF.

The query request response includes the multicast capability information of the T-RAN.

Optionally, S913 is performed. In S913, the SMF stores the multicast capability information of the T-RAN locally after receiving the multicast capability information of the T-RAN.

S914. The AMF sends a path switch request acknowledgment message to the T-RAN, where the path switch request acknowledgment message includes the information about the multicast session in S910.

The path switch request acknowledgment message is in response to the path switch request message in step S907.

S915. The SMF triggers establishment of a transmission path of the multicast session.

For the description of establishing the transmission path of the multicast session, refer to the related description of S811. For brevity, details are not described herein again.

In the method 900, if the SMF locally stores the multicast capability information of the T-RAN, there is no need to query the AMF. If the SMF does not locally store the multicast capability information of the T-RAN, the multicast capability information of the T-RAN is learned by querying the AMF. The AMF learns the multicast capability information of the T-RAN in advance through interaction between the T-RAN.

Figure 10:
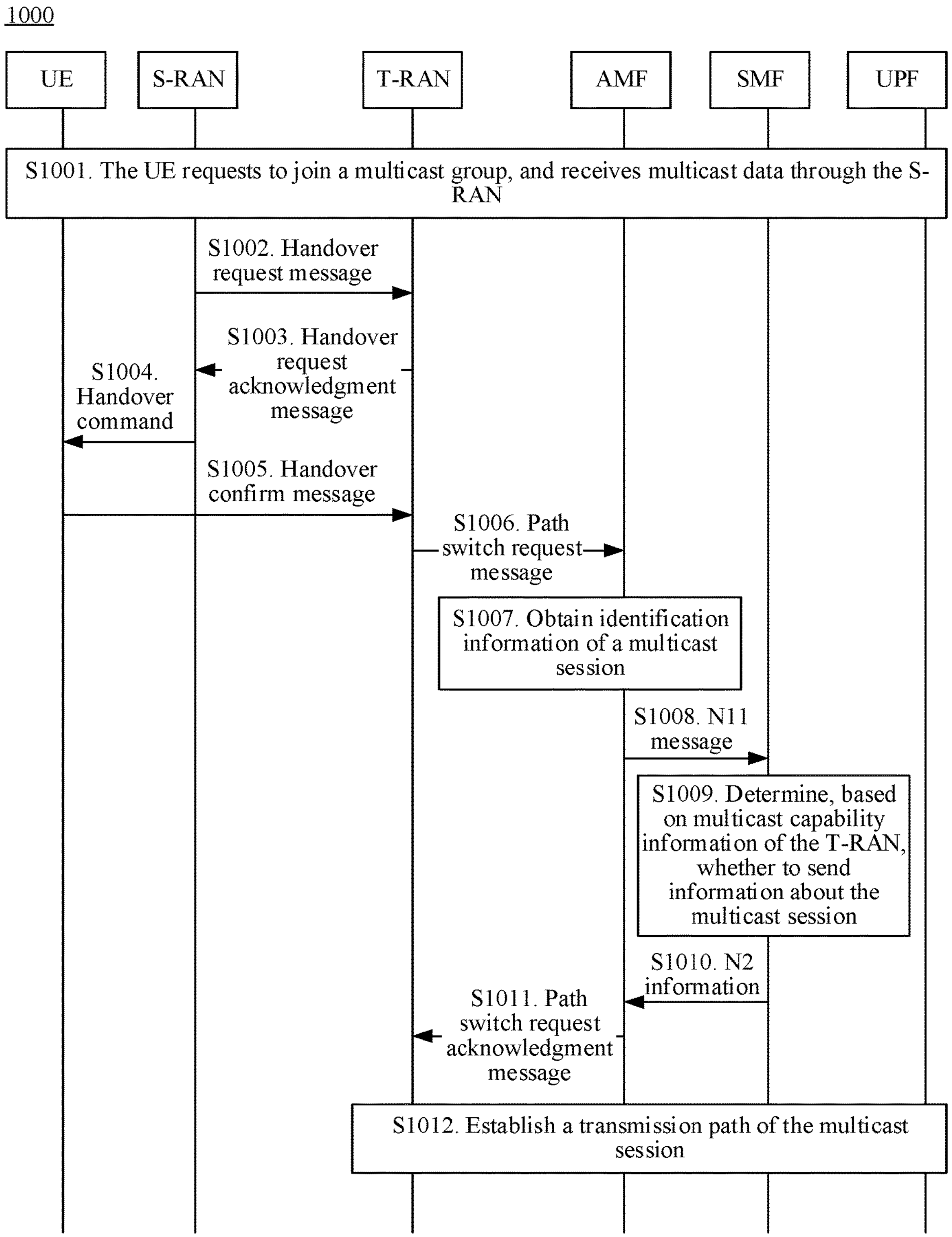
FIG. 10 is a schematic flowchart of another multicast service transmission method according to an embodiment of this application.

FIG. 10 is another schematic flowchart of a method 1000 for transmitting a multicast service according to an embodiment of this application. The method 1000 may be applied to the system architecture shown in FIG. 1. The method 1000 includes the following steps.

S1001. A UE requests to join a multicast group, and receives multicast data through an S-RAN.

Because the S-RAN does not support multicast, a core network sends the multicast data to the UE in a unicast mode.

S1002. The S-RAN sends a handover request message to a T-RAN.

The handover request message includes information of a unicast session context.

The S-RAN does not support multicast. Therefore, the S-RAN does not store any multicast information. The T-RAN supports multicast. However, because the handover request message sent by the S-RAN includes only the unicast session context, even if the T-RAN supports multicast, information about a multicast session cannot be obtained. The T-RAN does not know whether the UE is performing a multicast service.

S1003. The T-RAN sends a handover request acknowledgment (Handover Request ACK) message to the S-RAN.

The handover request acknowledgment message also includes only the information about the unicast session context.

Specifically, the T-RAN determines, based on local conditions, whether to establish all unicast resources or only some unicast resources.

S1004. The S-RAN sends a handover command to the UE.

The handover command may be carried by an RRC message.

S1005. The UE sends a handover confirm message to the T-RAN.

S1006. The T-RAN sends a path switch request message to an AMF.

A difference from S907 in FIG. 9 lies in that the path switch request message does not include location information.

S1007. The AMF obtains identification information of the multicast session.

Because the UE previously joined the multicast group, the AMF stores context information of the UE. The context information of the UE includes the identification information of the multicast session. The AMF obtains the identification information of the multicast session through the context information of the UE.

S1008. The AMF sends an N11 message to the SMF.

The N11 message includes the multicast capability information of the T-RAN.

S1009. The SMF determines, based on the multicast capability information of the T-RAN that is provided by the AMF, whether to send information of the multicast session (or establish a transmission path for the multicast session). If the T-RAN supports multicast, the SMF performs step S1010.

After receiving the multicast capability information of the T-RAN, the SMF stores the multicast capability information of the T-RAN locally.

S1010. The SMF sends N2 information to the AMF.

The N2 information includes the information about the multicast session.

S1011. The AMF sends a path switch request acknowledgment message to the T-RAN.

The path switch request acknowledgment message includes the information about the multicast session in S1010. The path switch request acknowledgment message is in response to the path switch request message in step S1006.

S1012. The SMF triggers establishment of a transmission path of the multicast session.

For the description of establishing the transmission path of the multicast session, refer to the description of S811. For brevity, details are not described herein again.

In the method 1000, the AMF sends the multicast capability information of the T-RAN to the SMF based on the identification information of the multicast session.

Figure 11:
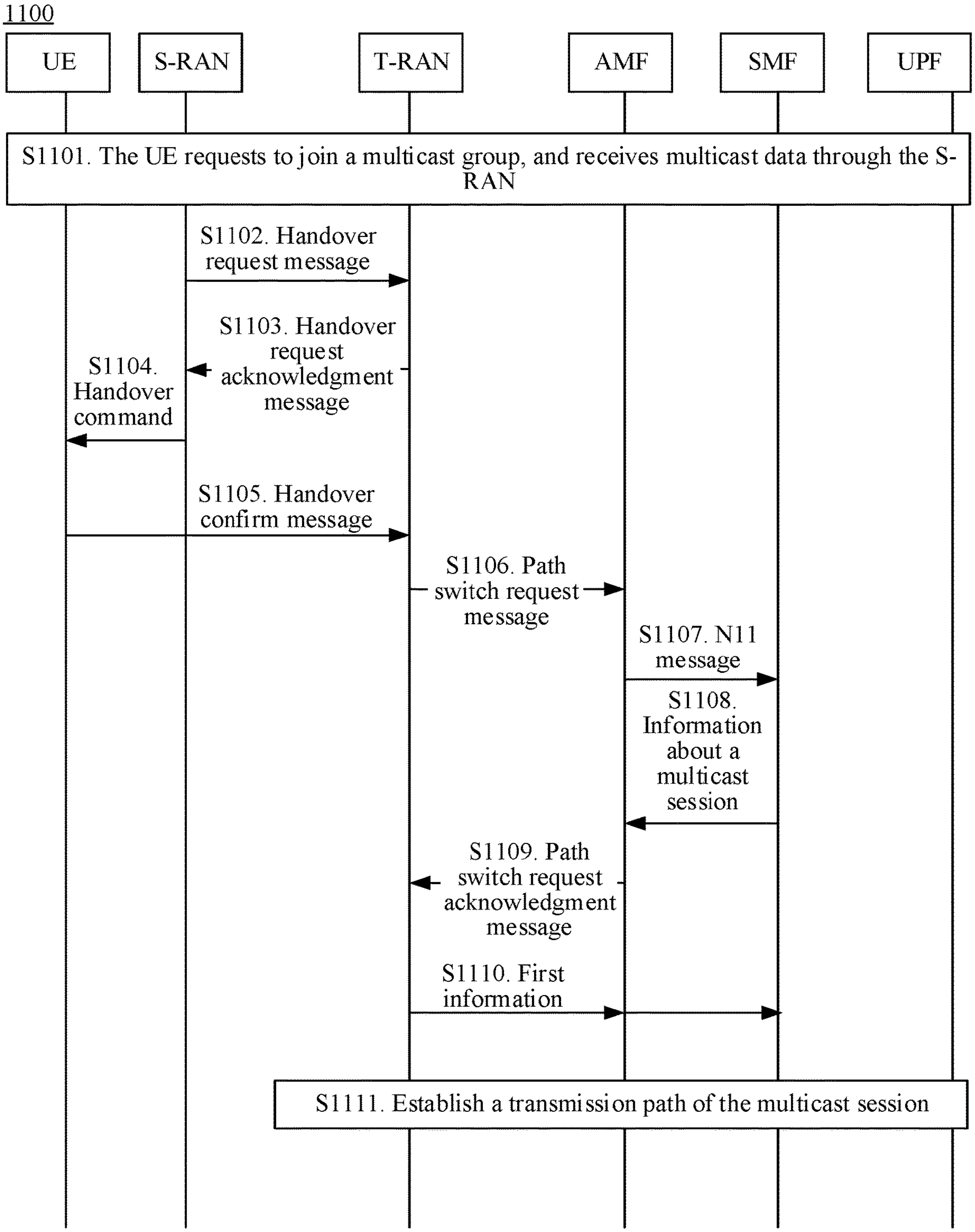
FIG. 11 is a schematic flowchart of another multicast service transmission method according to an embodiment of this application.

FIG. 11 is another schematic flowchart of a method 1100 for transmitting a multicast service according to an embodiment of this application. The method 1100 may be applied to the system architecture shown in FIG. 1. S1101 to S1106 are similar to S1001 to S1006 in FIG. 10, and details are not described below. The method 1100 includes the following steps.

S1101. A UE requests to join a multicast group, and receives multicast data through an S-RAN.

S1102. The S-RAN sends a handover request message to a T-RAN.

S1103. The T-RAN sends a handover request acknowledgment message to the S-RAN.

S1104. The S-RAN sends a handover command to the UE. The handover command may be carried by an RRC message.

S1105. The UE sends a handover confirm message to the T-RAN.

S1106. The T-RAN sends a path switch request message to an AMF.

S1107. The AMF sends an N11 message to the SMF.

S1108. The SMF sends information about a multicast session to the AMF.

For the information about the multicast session, refer to the foregoing description. For brevity, details are not described herein again.

The SMF does not know whether the T-RAN supports multicast, and sends the information about the multicast session to the T-RAN to test whether the T-RAN supports multicast.

Optionally, the SMF may first check whether multicast capability information of the T-RAN exists locally. If the multicast capability information of the T-RAN does not exist in the SMF locally, S1108 is performed.

S1109. The AMF sends a path switch request acknowledgment message to the T-RAN.

The path switch request acknowledgment message includes the information about the multicast session in S1108.

Optionally, the path switch request acknowledgment message further includes identification information of the multicast session.

S1108 and S1109 are used by the SMF to test whether the T-RAN supports multicast in a handover procedure. However, this application is not limited thereto. In another implementation, the SMF may also independently initiate a session establishment procedure to test whether the T-RAN supports multicast, that is, S1108 and S1109 may be independent of the handover procedure.

S1110. If the T-RAN supports multicast, the T-RAN sends first information to the SMF.

For description of the first information, reference is made to the description in the foregoing method 500. For brevity, details are not described herein again.

Specifically, the T-RAN may send the first information to the SMF through the AMF.

S1111. The SMF triggers establishment of a transmission path of the multicast session.

For the description of establishing the transmission path of the multicast session, refer to the related description of S811. For brevity, details are not described herein again.

In the method 1100, the SMF learns, by testing, whether the T-RAN supports multicast.

It may be understood that the examples in FIG. 8 to FIG. 11 in embodiments of this application are merely intended to help a person skilled in the art understand embodiments of this application, and are not intended to limit embodiments of this application to the specific scenarios shown in the examples. It is clear that a person skilled in the art can make various equivalent modifications or changes based on the examples shown in FIG. 8 to FIG. 11, and such modifications or changes also fall within the scope of embodiments of this application.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features may be combined with another feature as required. Correspondingly, the apparatus provided in this embodiment of this application may also correspondingly implement these features or functions. Details are not described herein again.

It may be further understood that the solutions in embodiments of this application may be properly combined for use, and explanations or descriptions of terms in the embodiments may be mutually referred to or explained in the embodiments. This is not limited.

It may be further understood that, in various embodiments of this application, sequence numbers of the foregoing processes do not mean execution sequences. The execution sequences of the processes should be determined based on functions and internal logic of the processes. Various numerical numbers or sequence numbers involved in the foregoing processes are merely distinguished for ease of description, and should not constitute any limitation on the implementation processes of embodiments of this application.

In the foregoing embodiments provided in this application, solutions of the service transmission method provided in embodiments of this application are separately described from a perspective of network elements and interaction between the network elements. It may be understood that, to implement the foregoing functions, each network element and device includes a corresponding hardware structure and/or a corresponding software module for performing each function. A person skilled in the art should be easily aware that the units and algorithm steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

Figure 12:
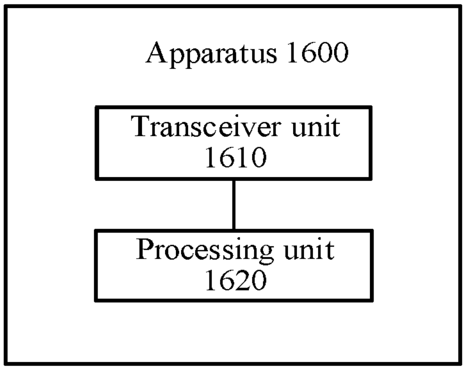
FIG. 12 is a schematic block diagram of a multicast service transmission apparatus according to an embodiment of this application.

FIG. 12 shows an apparatus 1600 for transmitting a multicast service according to an embodiment of this application. The apparatus 1600 includes a transceiver unit 1610 and a processing unit 1620.

In a possible implementation, the apparatus 1600 may be the session management network element in the foregoing embodiment, or may be a chip in the session management network element. The apparatus 1600 may implement steps or procedures performed by the session management network element in the foregoing method embodiment. The transceiver unit 1610 is configured to perform operations related to sending and receiving of the session management network element in the foregoing method embodiment. The processing unit 1620 is configured to perform a processing-related operation of the session management network element in the foregoing method embodiment.

For example, the apparatus is applied to a scenario in which a terminal device moves from a source access network device to a target access network device. The processing unit 1620 is configured to obtain multicast capability information of the target access network device.

The transceiver unit 1610 is configured to: when the multicast capability information indicates that the target access network device supports multicast, send information about a multicast session to the target access network device, where the information about the multicast session is used for allocating a transmission resource to the multicast session, and the multicast session is used for transmitting data of a multicast service corresponding to the terminal device.

Optionally, the processing unit 1620 is further configured to: before the session management network element obtains the multicast capability information of the target access network device, determine that the source access network device does not support multicast.

Optionally, that the processing unit 1620 obtains multicast capability information of the target access network device includes:

obtaining the multicast capability information based on an identifier of the target access network device and a first correspondence, where the first correspondence includes a correspondence between the identifier of the target access network device and the multicast capability information.

Optionally, the transceiver unit 1610 is further configured to:

receive the identifier of the target access network device from a mobility management network element.

Optionally, that the processing unit 1620 is configured to obtain multicast capability information of the target access network device includes:

invoking the transceiver unit 1610 to receive the multicast capability information of the target access network device from the mobility management network element.

Optionally, the transceiver unit 1610 is further configured to:

send a query request to the mobility management network element, where the query request is used for requesting multicast capability information of the target access network device.

Optionally, the query request includes an identifier of the terminal device or an identifier of the target access network device.

Optionally, the processing unit 1620 is further configured to: before the session management network element sends the query request to the mobility management network element, determine that the multicast capability information of the target access network device is not locally included.

Optionally, the multicast capability information of the target access network device is carried in an N11 interface message.

Alternatively, for example, the transceiver unit 1610 is configured to send the information about the multicast session to an access network device, where the information about the multicast session is used for allocating a transmission resource to the multicast session, and the multicast session is used for transmitting data of a multicast service; and is further configured to receive first information, where the first information indicates that the target access network device supports multicast.

The processing unit 1620 is configured to: trigger, based on the first information, a unicast user plane network element to configure a unicast protocol data unit PDU session, where the unicast PDU session is not used for transmitting the data of the multicast service; or trigger a multicast session management network element to send configuration information to a multicast user plane network element, where the configuration information is used for configuring the multicast user plane network element to stop transmitting the data of the multicast service to the unicast user plane network element.

Optionally, the processing unit 1620 is further configured to trigger, based on the first information, establishment of a multicast path between a user plane network element corresponding to the multicast session and the access network device.

Optionally, the access network device is a target access network device, and the apparatus is applied to a scenario in which a terminal device moves from a source access network device to the target access network device. The processing unit 1620 is further configured to: before sending the information about the multicast session to the access network device, determine that at least one of the following conditions is met: the source access network device does not support multicast, the session management network element does not include multicast capability information of the target access network device locally, or the session management network element does not include multicast capability information of the source access network device locally.

In another possible implementation, the apparatus 1600 may be the mobility management network element in the foregoing embodiment, or may be a chip in the mobility management network element. The apparatus 1600 may implement steps or procedures performed by the mobility management network element in the foregoing method embodiment. The transceiver unit 1610 is configured to perform operations related to sending and receiving of the mobility management network element in the foregoing method embodiment. The processing unit 1620 is configured to perform a processing-related operation of the mobility management network element in the foregoing method embodiment.

For example, the apparatus is applied to a scenario in which a terminal device moves from a source access network device to a target access network device, and the apparatus includes:

a processing unit 1620, configured to obtain multicast capability information of the target access network device; and a transceiver unit 1610, configured to send multicast capability information of the target access network device to a session management network element.

Optionally, that the transceiver unit 1610 sends multicast capability information of the target access network device to a session management network element includes: when the terminal device currently performs a multicast service, sending the multicast capability information of the target access network device to the session management network element.

Optionally, the processing unit 1620 is further configured to obtain identification information of a multicast session, where the multicast session is used for transmitting data of a multicast service corresponding to a terminal device. That the transceiver unit 1610 sends multicast capability information of the target access network device to a session management network element includes: sending the multicast capability information of the target access network device to the session management network element based on the identification information of the multicast session.

Optionally, that the processing unit 1620 obtains identification information of a multicast session includes: obtaining the identification information of the multicast session through multicast context information of a terminal device.

Optionally, the transceiver unit 1610 is further configured to receive a query request from the session management network element, where the query request is used for requesting the multicast capability information of the target access network device.

Optionally, the query request includes an identifier of the terminal device or an identifier of the target access network device.

Optionally, that the transceiver unit 1610 sends multicast capability information of the target access network device to a session management network element includes:

sending an N11 interface message to the session management network element, where the N11 interface message includes the multicast capability information of the target access network device.

In another possible implementation, the apparatus 1600 may be the access network device in the foregoing embodiment, or may be a chip in the access network device. The apparatus 1600 may implement steps or procedures performed by the access network device in the foregoing method embodiment. The transceiver unit 1610 is configured to perform operations related to sending and receiving of the access network device in the foregoing method embodiment. The processing unit 1620 is configured to perform a processing-related operation of the access network device in the foregoing method embodiment.

For example, the transceiver unit 1610 is configured to receive the information about the multicast session, where the multicast session is used for transmitting data of a multicast service, and is further configured to send first information to a session management network element, where the first information indicates that the target access network device supports multicast.

The processing unit 1620 is configured to establish a multicast path with a user plane network element corresponding to the multicast session; and is further configured to transmit the data of the multicast service through the multicast path.

Alternatively, for example, the transceiver unit 1610 is configured to receive a first message from a terminal device, where the first message includes indication information and/or identification information of a multicast session, and the indication information indicates that the terminal device is performing a multicast service or the terminal device has a demand for a multicast service.

The processing unit 1620 is configured to send multicast capability information of the access network device to a mobility management network element based on the first message.

The transceiver unit 1610 is further configured to receive the information about the multicast session from the mobility management network element, where the information about the multicast session is used for allocating a transmission resource to the multicast session, and the multicast session is used for transmitting data of a multicast service corresponding to the terminal device.

Optionally, the first message is a handover confirm message or a radio resource control RRC reconfiguration message.

Optionally, the apparatus is a target access network device.

Optionally, the multicast capability information of the access network device is carried in a path switch request message.

In another possible implementation, the apparatus 1600 may be the terminal device in the foregoing embodiment, or may be a chip in the terminal device. The apparatus 1600 may implement steps or procedures performed by the terminal device in the foregoing method embodiment. The transceiver unit 1610 is configured to perform operations related to sending and receiving of the terminal device in the foregoing method embodiment. The processing unit 1620 is configured to perform a processing-related operation of the terminal device in the foregoing method embodiment.

For example, the processing unit 1620 is configured to generate a first message, where the first message includes indication information and/or identification information of a multicast session, and the indication information indicates that the terminal device is performing a multicast service or the terminal device has a demand for a multicast service.

The transceiver unit 1610 is configured to send the first message to an access network device.

Optionally, the first message is a handover confirm message or a radio resource control RRC reconfiguration message.

Optionally, the access network device is a target access network device.

It should be understood that the apparatus 1600 herein is embodied in a form of a functional unit. The term "unit" herein may be an application-specific integrated circuit (ASIC), an electronic circuit, a processor (for example, a shared processor, a dedicated processor, or a group processor) configured to execute one or more software or firmware programs, a memory, a merge logic circuit, and/or another suitable component that supports the described function. In an optional example, a person skilled in the art may understand that the apparatus 1600 may be the session management network element in the foregoing embodiment, and may be configured to perform procedures and/or steps corresponding to the session management network element in the foregoing method embodiment. Alternatively, the apparatus 1600 may be the mobility management network element in the foregoing embodiment, and may be configured to perform procedures and/or steps corresponding to the mobility management network element in the foregoing method embodiment. Alternatively, the apparatus 1600 may be the terminal device in the foregoing embodiment, and may be configured to perform procedures and/or steps corresponding to the terminal device in the foregoing method embodiment. Alternatively, the apparatus 1600 may be the access network device in the foregoing embodiment, and may be configured to perform procedures and/or steps corresponding to the access network device in the foregoing method embodiment. To avoid repetition, details are not described herein again.

The apparatus 1600 in the foregoing solutions has a function of implementing corresponding steps performed by the session management network element in the foregoing methods. Alternatively, the apparatus 1600 in the foregoing solutions has a function of implementing corresponding steps performed by the mobility management network element in the foregoing methods. Alternatively, the apparatus 1600 may be the terminal device in the foregoing embodiments, and may be configured to perform procedures and/or steps corresponding to the terminal device in the foregoing method embodiments. Alternatively, the apparatus 1600 in the foregoing solutions has a function of implementing corresponding steps performed by the access network device in the foregoing methods. The function may be implemented by hardware, or may be implemented by hardware by executing corresponding software. The hardware or the software includes one or more modules corresponding to the foregoing functions. For example, the transceiver unit may be replaced by a transceiver (for example, the sending unit in the transceiver unit may be replaced by a transmitter, and the receiving unit in the transceiver unit may be replaced by a receiver). Another unit, such as a processing unit, may be replaced by a processor to separately perform a sending and receiving operation and a related processing operation in each method embodiment.

In addition, the transceiver unit may alternatively be a transceiver circuit (for example, may include a receive circuit and a sending circuit), and the processing unit may be a processing circuit. In this embodiment of this application, the apparatus in FIG. 12 may be the network element or device in the foregoing embodiment, or may be a chip or a chip system, for example, a system on chip (SoC). The transceiver unit may be an input/output circuit or a communication interface. The processing unit is a processor integrated on the chip, a microprocessor, or an integrated circuit. This is not limited herein.

Figure 13:
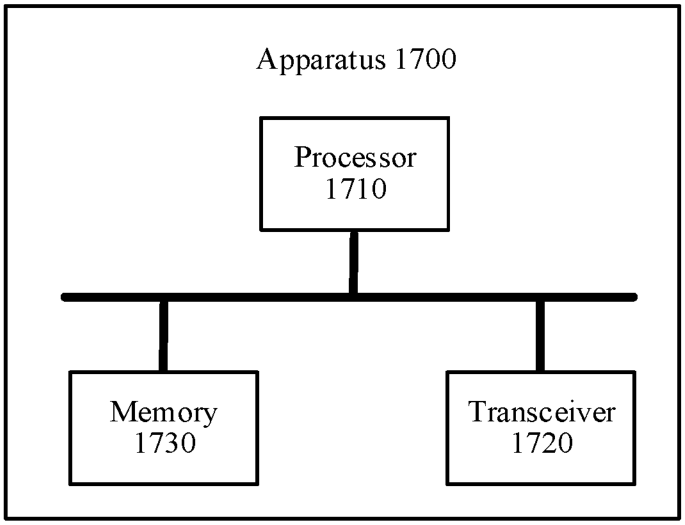
FIG. 13 is a schematic block diagram of another multicast service transmission apparatus according to an embodiment of this application.

FIG. 13 shows another apparatus 1700 for transmitting a multicast service according to an embodiment of this application. The apparatus 1700 includes a processor 1710 and a transceiver 1720. The processor 1710 and the transceiver 1720 communicate with each other through an internal connection path. The processor 1710 is configured to execute an instruction, to control the transceiver 1720 to send a signal and/or receive a signal.

Optionally, the apparatus 1700 may further include a memory 1730. The memory 1730 communicates with the processor 1710 and the transceiver 1720 through an internal connection path. The memory 1730 is configured to store an instruction, and the processor 1710 may execute the instruction stored in the memory 1730. In a possible implementation, the apparatus 1700 is configured to implement procedures and steps corresponding to the session management network element in the foregoing method embodiment. In another possible implementation, the apparatus 1700 is configured to implement procedures and steps corresponding to the access and mobility management network element in the foregoing method embodiment. In another possible implementation, the apparatus 1700 is configured to implement procedures and steps corresponding to the access network device in the foregoing method embodiment.

It should be understood that the apparatus 1700 may be the session management network element, the access and mobility management network element, or the access network device in the foregoing embodiments, or may be a chip or a chip system. Correspondingly, the transceiver 1720 may be a transceiver circuit of the chip. This is not limited herein. Specifically, the apparatus 1700 may be configured to perform steps and/or procedures corresponding to the session management network element, the access and mobility management network element, or the access network device in the foregoing method embodiments. Optionally, the memory 1730 may include a read-only memory and a random access memory, and provide an instruction and data to the processor. A part of the memory may further include a non-volatile random access memory. For example, the memory may further store information of a device type. The processor 1710 may be configured to execute the instruction stored in the memory, and when the processor 1710 executes the instruction stored in the memory, the processor 1710 is configured to perform steps and/or procedures corresponding to the foregoing method embodiments of the session management network element, the access and mobility management network element, or the access network device.

In an implementation process, steps in the foregoing methods can be implemented through an integrated logic circuit of hardware in the processor, or through an instruction in a form of software. The steps of the methods disclosed with reference to embodiments of this application may be directly performed and completed by a hardware processor, or may be performed and completed through a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that the processor in this embodiment of this application may be an integrated circuit chip, and has a signal processing capability. In an implementation process, the steps in the foregoing method embodiments may be completed through an integrated logic circuit of hardware in the processor or an instruction in a form of software. The foregoing processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logical block diagrams that are disclosed in embodiments of this application may be implemented or performed. The general purpose processor may be a microprocessor, the processor may be any conventional processor, or the like. Steps of the methods disclosed with reference to embodiments of this application may be directly performed and completed through a hardware decoding processor, or may be performed and completed through a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories of the system and the method described herein are intended to include, but are not limited to, these and any other suitable types of memories.

According to the method provided in this embodiment of this application, this application further provides a computer program product. The computer program product includes computer program code. When the computer program code is run on a computer, the computer is enabled to perform steps or procedures performed by the session management network element, the mobility management network element, the terminal device, or the access network device (for example, the target access network device) in the embodiments shown in FIG. 4 to FIG. 11.

According to the method provided in embodiments of this application, this application further provides a computer-readable storage medium. The computer-readable storage medium stores program code. When the program code is run on a computer, the computer is enabled to perform steps or procedures performed by the session management network element, the mobility management network element, the terminal device, or the access network device (for example, the target access network device) in the embodiments shown in FIG. 4 to FIG. 11.

According to the method provided in embodiments of this application, this application further provides a communication system, including the foregoing session management network element, mobility management network element, terminal device, or access network device (for example, a target access network device).

It should be understood that "at least one" in this specification refers to one or more, and "a plurality of" refers to two or more. The term "and/or" is an association relationship for describing associated objects and represents that three relationships may exist. For example, A and/or B may represent the following three cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one item (piece) of a, b, and c may represent: a, or b, or c, or a and b, or a and c, or b and c, or a, b, and c, where a, b, and c may be singular or plural.

The terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from a variety of computer-readable storage media having various data structures stored thereon. The components may communicate through a local and/or remote process, for example, based on a signal having one or more data packets (for example, data from two components interacting with another component in a local system, a distributed system, and/or across a network such as the internet interacting with another system through the signal).

A person of ordinary skill in the art may be aware that, with reference to the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for the specific working process of the foregoing system, apparatus, and units, refer to the corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be another division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multicast service transmission method, comprising:

sending, by a session management network element in response to determining that a source access network device of a terminal device does not support multicast, information about a multicast session to a target access network device of the terminal device, wherein the information about the multicast session is used for allocating a transmission resource to the multicast session, and the multicast session is used for transmitting data of a multicast service;

receiving, by the session management network element from the target access network device, first information indicating that the target access network device supports multicast;

sending, by the session management network element, a message to the target access network device to establish a multicast tunnel between the multicast user plane network element corresponding to the multicast session and the target access network device, and sending, by the session management network element, a request message to a multicast session management network element to enable a multicast user plane network element corresponding to the multicast session to stop transmitting the data of the multicast service to a unicast user plane network element associated with the multicast session.

2. The method of claim 1, wherein the transmission resource comprises: a frequency domain resource or a spectrum resource.

3. The method of claim 1, wherein the information about the multicast session comprises one or more of the following information: context information of the multicast session, a quality of service (QoS) parameter of the multicast session, an association relationship between a unicast session and the multicast session, a QoS parameter of the unicast session, or identification information of the multicast session.

4. The method of claim 3, wherein the identification information of the multicast session is a temporary multicast group identifier (TMGI).

5. A communication system, comprising: a session management network element and one or more access network devices; wherein the session management network element is configured to send information about a multicast session to a target access network device of a terminal device when determining that a source access network device of the terminal device does not support multicast, wherein the information about the multicast session is used for allocating a transmission resource to the multicast session, and the multicast session is used for transmitting data of a multicast service;

the target access network device is configured to: receive the information about the multicast session, and send first information to the session management network element, wherein the first information indicates that the target access network device supports multicast;

the session management network element is further configured to: receive the first information, send a message to the target access network device to establish a multicast tunnel between the multicast user plane network element corresponding to the multicast session and the target access network device, and send a request message to a multicast session management network element to enable a multicast user plane network element corresponding to the multicast session to stop transmitting the data of the multicast service to a unicast user plane network element associated with the multicast session; and the target access network device is further configured to receive the message and establish the multicast tunnel with the multicast user plane network element.

6. The communication system of claim 5, wherein the multicast tunnel is a resource for multicast transmission between the target access network device and the multicast user plane network element.

7. The communication system of claim 5, wherein the information about the multicast session comprises one or more of the following information: context information of the multicast session, a quality of service (QoS) parameter of the multicast session, an association relationship between a unicast session and the multicast session, a QoS parameter of the unicast session, or identification information of the multicast session.

8. The communication system of claim 7, wherein the identification information of the multicast session is a temporary multicast group identifier (TMGI).

9. A communication apparatus, comprising:

at least one processor, configured to execute computer instructions stored in a memory, to cause the communication apparatus to perform the following steps:

sending information about a multicast session to a target access network device of a terminal device when determining that a source access network device of the terminal device does not support multicast, wherein the information about the multicast session is used for allocating a transmission resource to the multicast session, and the multicast session is used for transmitting data of a multicast service;

receiving first information from the access network device, wherein the first information indicates that the access network device supports multicast;

sending a message to the target access network device to establish a multicast tunnel between the multicast user plane network element corresponding to the multicast session and the target access network device, and sending a request message to a multicast session management network element to enable a multicast user plane network element corresponding to the multicast session to stop transmitting the data of the multicast service to a unicast user plane network element associated with the multicast session.

10. The communication apparatus of claim 9, wherein the multicast tunnel is a resource for multicast transmission between the target access network device and the multicast user plane network element.

* * * * *